(12) United States Patent
Floyd

(10) Patent No.: US 12,118,665 B2
(45) Date of Patent: *Oct. 15, 2024

(54) SYSTEMS AND METHODS FOR CONTROLLING A FLEET OF DRONES FOR DATA COLLECTION

(71) Applicant: State Farm Mutual Automobile Insurance Company, Bloomington, IL (US)

(72) Inventor: Matthew L. Floyd, Alpharetta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/896,032

(22) Filed: Aug. 25, 2022

(65) Prior Publication Data

US 2022/0406012 A1    Dec. 22, 2022

Related U.S. Application Data

(63) Continuation of application No. 16/786,299, filed on Feb. 10, 2020, now Pat. No. 11,430,180, which is a (Continued)

(51) Int. Cl.
*G06T 17/05*    (2011.01)
*B64C 39/02*    (2023.01)
(Continued)

(52) U.S. Cl.
CPC ............ *G06T 17/05* (2013.01); *B64C 39/024* (2013.01); *G05D 1/104* (2013.01); *G06Q 40/08* (2013.01);
(Continued)

(58) Field of Classification Search
CPC ...................................................... G06T 17/05
See application file for complete search history.

(56) References Cited

U.S. PATENT DOCUMENTS 5,523,942 A    6/1996   Tyler et al.
8,346,578 B1   1/2013   Hopkins, III et al.
(Continued)

FOREIGN PATENT DOCUMENTS

KR         101747025 B1       6/2017
WO    WO2011057217    *  11/2009

OTHER PUBLICATIONS

Okutake, T., et al., in "A Collaborative Safety Flight Control System for Multiple Drones," in 2016 10th International Conference on Innovative Mobile and Internet Services in Ubiquitous Computing (Year: 2016).*

(Continued)

*Primary Examiner* — Olabode Akintola
*Assistant Examiner* — Brandon M Duck
(74) *Attorney, Agent, or Firm* — Armstrong Teasdale LLP

(57) ABSTRACT

A damage identification (DI) system for identifying property damage may include a drone fleet including several autonomous or semi-autonomous drones communicatively coupled together and a DI computing device. Each drone may collect drone-collected damage data, including image data. The DI computing may assign a geographical region to the drone fleet. The drone fleet may automatically navigate to, and then within, the geographical region to detect potential damage to properties. The DI computing device may further receive drone-collected damage data associated with a property within the geographical region from the drone fleet when the drone fleet determines the property is actually or potentially damaged, generate aggregated damage data associated with the property based at least partially upon the drone-collected damage data, and/or store the aggregated (Continued)

damage data in a blockchain structure associated with the property for damage assessment of the property.

20 Claims, 11 Drawing Sheets

Related U.S. Application Data continuation of application No. 15/917,240, filed on Mar. 9, 2018, now Pat. No. 10,593,109.

(60) Provisional application No. 62/540,876, filed on Aug. 3, 2017, provisional application No. 62/527,745, filed on Jun. 30, 2017, provisional application No. 62/525,533, filed on Jun. 27, 2017.

(51) Int. Cl.
*B64U 10/00* (2023.01)
*G05D 1/00* (2006.01)
*G05D 1/10* (2006.01)
*G06Q 40/08* (2012.01)
*G06Q 50/163* (2024.01)
*B64U 101/30* (2023.01)

(52) U.S. Cl.
CPC .......... *G06Q 50/163* (2013.01); *B64U 10/00* (2023.01); *B64U 2101/30* (2023.01); *B64U 2201/10* (2023.01)

(56) References Cited

U.S. PATENT DOCUMENTS

| | | |
|---|---|---|
| 9,129,355 B1 | 9/2015 | Harvey et al. |
| 9,152,863 B1 | 10/2015 | Grant |
| 9,505,494 B1 | 11/2016 | Marlow et al. |
| 9,609,288 B1 | 3/2017 | Richman et al. |
| 9,846,915 B2 | 12/2017 | Howe et al. |
| 9,864,372 B2 | 1/2018 | Chen et al. |
| 10,134,092 B1 | 11/2018 | Harvey et al. |
| 10,650,285 B1 | 5/2020 | Okazaki |
| 10,762,572 B1 | 9/2020 | Hopkins et al. |
| 2004/0030571 A1 | 2/2004 | Solomon |
| 2005/0251427 A1 | 11/2005 | Dorai et al. |
| 2006/0058928 A1 | 3/2006 | Beard et al. |
| 2009/0265193 A1 | 10/2009 | Collins et al. |
| 2010/0163621 A1 | 7/2010 | Ben-Asher et al. |
| 2010/0268409 A1 | 10/2010 | Vian et al. |
| 2011/0090337 A1 | 4/2011 | Klomp et al. |
| 2013/0226624 A1 | 8/2013 | Blessman et al. |
| 2013/0317861 A1 | 11/2013 | Tofte et al. |
| 2013/0317865 A1 | 11/2013 | Tofte et al. |
| 2014/0163772 A1 | 6/2014 | Vian et al. |
| 2014/0316614 A1 | 10/2014 | Newman |
| 2014/0316616 A1 | 10/2014 | Kugelmass |
| 2015/0025914 A1 | 1/2015 | Lekas |
| 2015/0317739 A1 | 11/2015 | Lawlor et al. |
| 2015/0363717 A1 * | 12/2015 | Lim ................ G06Q 10/10 |
| 2016/0063642 A1 | 3/2016 | Luciani et al. |
| 2016/0192166 A1 | 6/2016 | deCharms |
| 2016/0313736 A1 | 10/2016 | Schultz et al. |
| 2017/0068243 A1 | 3/2017 | MacCready et al. |
| 2017/0221110 A1 * | 8/2017 | Sullivan ............ G06Q 30/0278 |
| 2017/0270650 A1 | 9/2017 | Howe et al. |
| 2017/0352099 A1 | 12/2017 | Howe et al. |
| 2017/0352100 A1 | 12/2017 | Shreve et al. |
| 2018/0357720 A1 | 12/2018 | Grant |
| 2018/0373931 A1 | 12/2018 | Li |

OTHER PUBLICATIONS

"Collaborative Drone Footage Capture Utilizing Predictive Analysis", IP.com, (Year: 2016).

Francis et al, "The Blockchain Imperative: The Next Challenge for P&C Carriers", Cognizant, Nov. 2016, 20 pages.

Henk et al., "Blockchain: An Insurance Focus" Milliman, Nov. 2016, 4 pages.

Jenie, "Autonomous Conflict Detection and Resolution for Unmanned Aerial Vehicles On integration into the Airspace System", Delft University of Technology, 2017, 143 pages.

Mainelli et al., "Chain Reaction: How Blockchain Technology Might Transform Wholesale Insurance", PWC, Jul. 2016, 58 pages.

Martin, "New generation of drones set to revolutionize warfare", Web Article, 60 Minutes, CBS News, First published Jan. 5, 2017, URL: https://www.cbsnews.com/news/60-minutes-autonomous-drones-set-to-revolutionize-military-technology/.

North D., Private Drones: Regulations and Insurance, 2014, Issue 2, pp. 334-357. (Year: 2014).

* cited by examiner

SYSTEMS AND METHODS FOR CONTROLLING A FLEET OF DRONES FOR DATA COLLECTION

RELATED APPLICATIONS

This application is a continuation application of U.S. patent application Ser. No. 16/786,299, filed Feb. 10, 2020, entitled "SYSTEMS AND METHODS FOR CONTROLLING A FLEET OF DRONES FOR DATA COLLECTION," which is a continuation application of U.S. patent application Ser. No. 15/917,240 (now U.S. Pat. No. 10,593,109), filed Mar. 9, 2018, entitled "SYSTEMS AND METHODS FOR CONTROLLING A FLEET OF DRONES FOR DATA COLLECTION," which claims priority to U.S. Provisional Patent Application No. 62/525,533, filed Jun. 27, 2017, entitled "SYSTEMS AND METHODS FOR CONTROLLING A FLEET OF DRONES FOR DATA COLLECTION," and U.S. Provisional Patent Application No. 62/527,745, filed Jun. 30, 2017, entitled "SYSTEMS AND METHODS FOR CONTROLLING A FLEET OF DRONES FOR DATA COLLECTION," and U.S. Provisional Patent Application No. 62/540,876, filed Aug. 3, 2017, entitled "SYSTEMS AND METHODS FOR CONTROLLING A FLEET OF DRONES FOR DATA COLLECTION," the entire contents and disclosure of which are hereby incorporated by reference herein in their entirety.

FIELD OF THE DISCLOSURE

The present disclosure relates to controlling a fleet of drones and, more particularly, to systems and methods for controlling a fleet of autonomous or semi-autonomous drones for collecting data including property damage, aggregating the collected data using a damage identification computing device in communication with the fleet of drones, and/or storing the aggregated data in a blockchain structure as a record of property damage.

BACKGROUND

Properties, such as buildings and vehicles, may be susceptible to damage. For example, property may be damaged during inclement weather conditions (e.g., hail, thunderstorms, blizzards, tornados, hurricanes, etc.) or by accidents caused by people. The damage may result in an owner of the property to repair and/or replace one or more components of the property. In some cases, the damage may be extensive enough to cause the owner to replace the entire property. The owner of the property may have an insurance policy with an insurance provider that is associated with the property to reduce the costs incurred by the owner at the time of repairs and/or replacement. That is, when the owner or insurance policyholder submits an insurance claim to the insurance provider, the insurance provider may assist with the costs to repair and/or replace the property to resolve the insurance claim.

To verify the authenticity and severity of an insurance claim, the insurance provider may request proof of the damage. In some examples, image and/or video data of the damage may be submitted to the insurance provider by the policyholder as evidence. In other examples, an inspecting party may be dispatched to the property to examine the damage and determine a severity of the damage. However, these known methods of collecting data associated with the damage may be time-consuming, inefficient, and/or incomplete.

For example, a drone or unmanned vehicle may be deployed to a property to collect image and/or video data of damage. However, to collect a sufficient amount of data associated with the damage, the drone may be required to be repositioned in several locations around the property, thereby increasing the amount of time of the data collection process. However, using multiple drones to capture the data may increase the risk of collisions between the drones and/or increase the amount of overlap between the collected data, particularly for manually controlled drones. Using these known methods to collect data for resolving insurance claims may result in extended time periods to resolve insurance claims and/or resolving insurance claims inaccurately.

BRIEF SUMMARY

The present embodiments may relate to a damage identification (DI) system for assessing potential damage to property. The DI system may include a DI computing device and a fleet of drones (drone fleet) communicatively coupled to the DI computing device. The drone fleet may include a plurality of autonomous and/or semi-autonomous drones. The DI computing device may assign a geographical region to the drone fleet. The drone fleet may automatically navigate within the assigned geographical region and collect sensor data to detect property damage. The drones within the drone fleet may communicate with each other to prevent collisions, optimize their navigation paths, identify property from the sensor data, and/or determine if a property has been potentially damaged. When property damage is detected, the drones may automatically position themselves around the damaged property to collect damage data associated with the property. The drones may communicate with each other to such that each drone may be positioned at a different location, angle, elevations, and the like to reduce overlap of the drone-collected damage data. The drone-collected damage data may then be transmitted to the DI computing device.

The DI computing device may accumulate the drone-collected damage data and/or other damage data associated with the property and generate aggregated damage data associated with the property based at least partially upon the drone-collected damage data. The DI computing device may store the aggregated damage data in a block of a blockchain associated with the property to maintain a secure historical record of damage to the property. An insurance provider may access the blockchain when resolving an insurance claim associated with the property to determine whether or not damage occurred, a potential cause of the damage, and/or what is the extent of the damage.

In one aspect, a DI system for identifying property damage may include a drone fleet including a plurality of drones communicatively coupled together and a DI computing device. Each drone may collect damage data, including image data. The DI computing device includes at least one processor and a memory communicatively coupled to the processor. The processor may be programmed to assign a geographical region to the drone fleet. The drone fleet may automatically navigate within the geographical region to detect potential damage to properties. The processor may be further programmed to receive drone-collected damage data associated with a first property within the geographical region from the drone fleet when the drone fleet determines the first property is potentially damaged, generate aggregated damage data associated with the first property based at least partially upon the drone-collected damage data, and/or store the aggregated damage data in a blockchain structure associated with the first property for damage assessment of the first property. The system may include additional, less, or alternate functionality, including that discussed elsewhere herein.

In another aspect, a computer-implemented method for identifying property damage may be provided. The method may be at least partially performed by a DI computing device. The method may include (1) assigning a geographical region to a drone fleet including a plurality of drones communicatively coupled together, (2) automatically navigating the drone fleet within the geographical region to collect damage data associated with potentially damaged properties, (3) receiving drone-collected damage data associated with a first property within the geographical region from the drone fleet when the drone fleet determines the first property is potentially damaged, (4) generating aggregated damage data associated with the first property based at least partially upon the drone-collected damage data, and/or (5) storing the aggregated damage data in a blockchain structure associated with the first property for damage assessment of the first property. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions may cause the processor to assign a geographical region to a drone fleet including a plurality of drones communicatively coupled together. The drone fleet may automatically navigate within the geographical region to detect potential damage to properties. The computer-executable instructions may further cause the processor to receive drone-collected damage data associated with a first property within the geographical region from the drone fleet when the drone fleet determines the first property is potentially damaged, generate aggregated damage data associated with the first property based at least partially upon the drone-collected damage data, and/or store the aggregated damage data in a blockchain structure associated with the first property for damage assessment of the first property. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
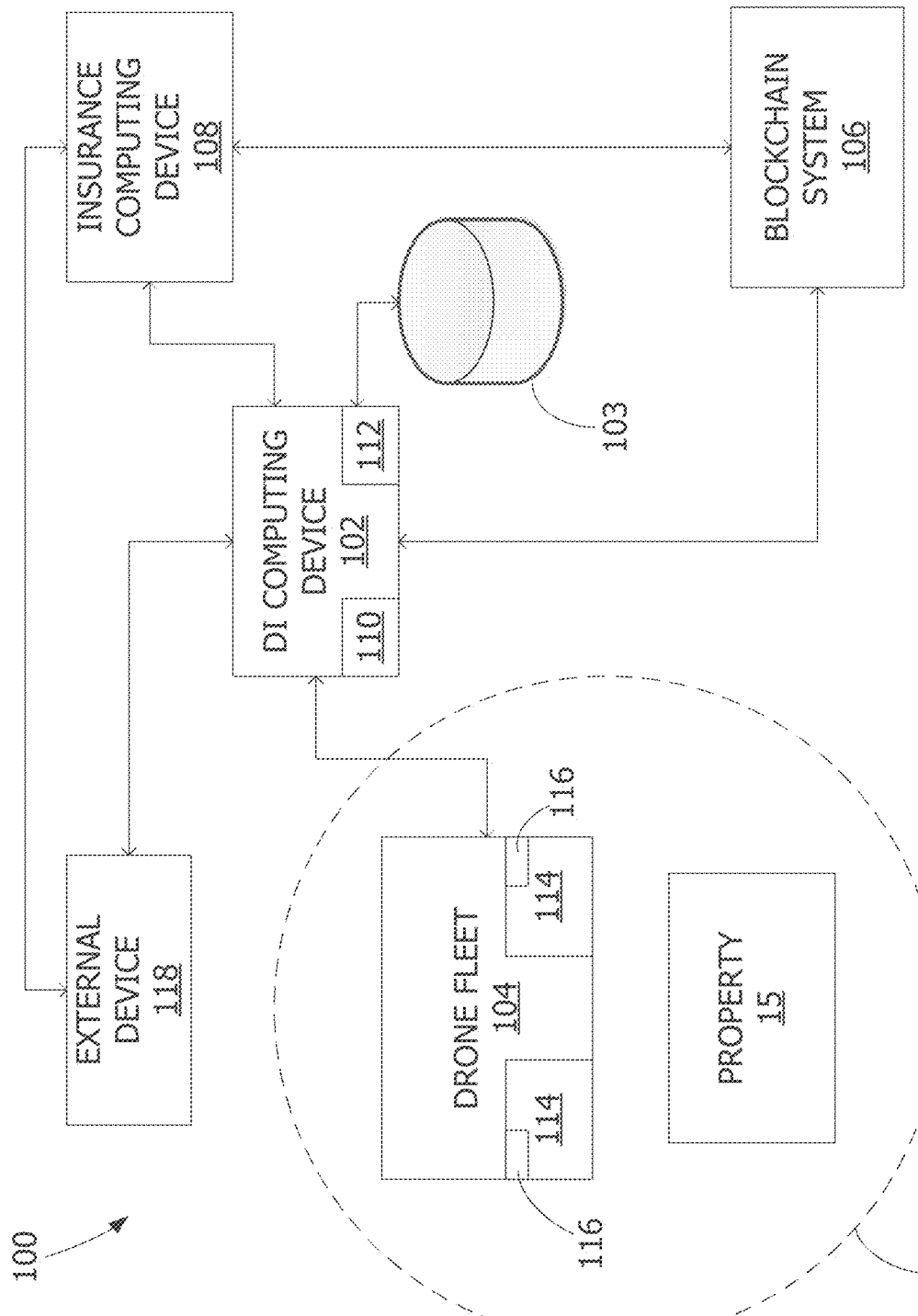
FIG. 1 illustrates a block diagram of an exemplary damage identification (DI) system for identifying property damage in a geographical region.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for controlling a fleet of autonomous or semi-autonomous drones for collecting data including property damage, aggregating the collected data using a damage identification computing device in communication with the fleet of drones, and/or storing the aggregated data in a blockchain structure as a record of property damage.

In one exemplary embodiment, a damage identification (DI) system may be provided for determining property damage within a geographical region. As used herein, "property" refers to buildings, vehicles, and/or other insurable objects. The DI system may include a DI computing device and a drone fleet. The DI computing device may include at least one processor and a memory communicatively coupled to the at least one processor. The DI computing device may be configured to receive damage data associated with a property, aggregate the damage data, store the aggregated damage data, and/or assess damage to the property based at least partially on the aggregated damage data as described herein. Damage data is data that provides details regarding damage to a property, an environment surrounding the property, and/or other information associated with potential damage to the property. In one example, damage data may include, but is not limited to, image data, video data, location data, time data, audio data, mechanical data (e.g., force data, strain data, etc.), electrical data, and/or weather data. In some embodiments, the DI computing device may be associated with an insurance provider that provides insurance policies for properties.

The drone fleet may include a plurality of drones for collecting damage data associated with properties within a geographical region. As used herein, a "drone" may be an unmanned vehicle configured to perform one or more actions, such as navigating along a path, based upon instructions received remotely from a user and/or based upon a predetermined set of instructions stored at the drone. That is, in the exemplary embodiment, the drones may be autonomous or semi-autonomous such that at least some actions performed by the drone may be automated. The drones may be any suitable kind of aerial drones, unmanned aerial systems or vehicles, land drones, rovers, nautical drones, aeronautical drones, and/or combinations thereof. The DI computing device may be communicatively coupled to all of the drones or a subset of the drones within the drone fleet. In one example, the DI computing device may communicate directly (i.e., no drones of the drone fleet intervene between the DI computing device and the drone during communication) with one or more drones within the drone fleet. The one or more drones may act as communication gateways such that data from the DI computing device may be distributed to the drone fleet through the one or more drones and the data from the drone fleet may be transmitted to the DI computing device via the one or more drones.

The drones in the drone fleet may be communicatively coupled to each other to facilitate coordination of tasks between the drones and to reduce the overlap of actions performed by the drones as described herein. In the exemplary embodiment, the drones within the drone fleet may be configured to communicate with each other to facilitate coordinated movement when deployed. That is, each drone communicates, such as via wireless communication over a radio frequency or communication channel, with the other drones to establish a formation of the drone fleet and a navigation path. For example, while navigating in a formation, the drones may be configured to determine and communicate information with each other such as a designated position for a drone within the formation, a recommended distance between each drone, a distance from a one or more designated drones (e.g., a drone at the center or the edges of the formation), and/or a current location of the drone. A drone may be configured to bid for a particular position in the formation and/or the drone may be assigned a position by one or more designed drones and/or the DI computing device. Other information, such as battery life, location data (e.g., Global Positioning System (GPS) data), and/or flight data, may be communicated between the drones to facilitate organized actions by the drone fleet.

Each drone may include a sensor assembly to collect sensor data. The sensor assembly may include one or more sensors configured to capture specific types of data. In the exemplary embodiment, the sensor assembly may be configured to capture image data and/or video data. The image data and/or video data may include any suitable types of image and video data (e.g., visible, ultrasonic, infrared, ultraviolet, etc.) Additionally or alternatively, the sensor assembly may be configured to collect other sensor data, such as, and without limitation, audio data and/or temperature data. The sensor data may be used to facilitate navigation by the drone fleet and/or collection of damage data as described herein.

In the exemplary embodiment, the DI computing device may be configured to provide instructions to the drone fleet to collect damage data within a geographical region. The geographical region may be, for example, a city, a town, a neighborhood, a street, an area defined by a user of the DI computing device, and/or any suitable geographical area. In the exemplary embodiment, the geographical region includes one or more properties. The DI computing device may be configured to store region data defining the geographical region in a database. To deploy the drone fleet to the geographical region, the DI computing device may assign the drone fleet to the region. In at least one embodiment, the DI computing device may transmit the region data associated with the geographical region to the drone fleet. The DI computing device may instruct the drone fleet to identify property damage within the geographical region. The drone fleet may deploy in response to the assignment and navigate around the geographical region to identify potential property damage.

In some embodiments, the DI computing device may instruct the drone fleet to identify property damage for specific properties within the geographical region. For example, the DI computing device may instruct the drone fleet to identify property damage for properties within the geographical region that are insured by insurance policies provided by a specific insurance provider. In such embodiments, the DI computing device may transmit a list of insured properties stored in the database to the drone fleet. The list of insured properties may include geographical locations of each insured property to enable the drone fleet to generate and optimize a navigation path between the insured properties. In certain embodiments, the list of insured properties includes baseline data for at least some of the insured properties. The baseline data is data representing undamaged properties and may be used for identifying damage. The baseline data may include previously captured image data, video data, and/or characteristics of the property (e.g., dimensions).

In the exemplary embodiment, at least some drones of the drone fleet may be configured to perform object recognition when deployed to identify properties. More specifically, the drones may use any suitable object recognition techniques on image data and/or video data collected by the sensor assembly to identify properties. When a property is identified, the drones may analyze the captured sensor data to determine whether or not damage has potentially occurred to the property. The drones may be configured to use machine learning, pattern recognition, neural networks, fuzzy logic, artificial intelligence, and/or other analysis techniques to identify damage to the property. In at least some embodiments, the drones may communicate with each other to attempt to establish a damage consensus associated with the property. The damage consensus is a collective decision whether or not the property is damaged. The damage consensus may be qualitative or quantitative (e.g., a score represent an amount damage or a confidence level that damage has occurred). In the exemplary embodiment, at least some drones evaluate damage to the property based on the collected sensor data. The evaluations are distributed to other drones in the drone fleet to establish the damage consensus. In some embodiments, the drone fleet may be configured to compare the damage consensus to a predetermined damage threshold to determine if the damage to the property is sufficient to transmit damage data to the DI computing device.

When the property is determined to be damaged, the drone fleet may be configured to capture drone-collected damage data (i.e., sensor data) associated with the property. The drones may be arranged in various positions, elevations, angles, and the like to capture more drone-collected damage data at a time than a single drone is capable of capturing at a time. In one example, each drone may claim or may be assigned to a particular position, elevation, angle, and/or type of drone-collected damage data (e.g., image or video data) to reduce overlap between the drone-collected damage data, thereby reducing the time necessary to capture all of the drone-collected damage data. For example, the drones may be positioned around the property to form a dome-like formation when collecting the damage data. In certain embodiments, the drones may be configured to communicate the captured drone-collected damage data to each other to check the quality of the drone-collected damage data.

The drone-collected damage data may be transmitted to the DI computing device. In at least some embodiments, the drone-collected damage data may be geo-tagged (i.e., location data of the drone is sent with the damage data), timestamped, and/or may include a digital signature identifying the drone that captured the drone-collected damage data. In certain embodiments, the drone-collected damage data may include a property identifier to identify which property is associated with the drone-collected damage data. In some embodiments, the DI computing device may analyze the collected damage data and determine if additional damage data should be collected. The DI computing device may transmit a request to the drone fleet to collect the additional damage data. The DI computing device may be configured to generate aggregated damage data based at least partially upon the drone-collected damage data from the drone fleet. Aggregated damage data may be a collection of damage data associated with the property. In some embodiments, the aggregated damage data may include raw drone-collected damage data. In the exemplary embodiment, the DI computing device may be configured to stitch or combine image data from the drone or drones together to generate a graphical three dimensional (3D) model of the property. The 3D model may facilitate review of the drone-collected damage data from the drones using a single, unified visual model.

In some embodiments, the DI computing device may be configured to receive damage data from devices other than the drone fleet. In one example, the DI computing device may be communicatively coupled to one or more external devices to receive external damage data. External damage data may be similar to drone-collected damage data. External device may be a user computing device, such as a smartphone, a tablet, a wearable electronic, or a laptop, sensor systems embedded into properties, and/or other devices configured to capture damage data. The external damage data may be combined with the drone-collected damage data to generate the aggregated damage data.

In the exemplary embodiment, the DI computing device may be configured to store the aggregated damage data in a blockchain structure (e.g., a block). A blockchain is a distributed database that maintains a continuously-growing list of ordered records, known as blocks. Each block may contain at least a timestamp and a link to the previous block in the chain. The link to the previous block may be a hash of the previous block. In the exemplary embodiment, the blockchains are associated with a respective property, and each block may represent aggregated damage data associated with the property at a particular period of time. For example, a first block in a blockchain associated with a property may be the first instance of aggregated damage data for the property. The second block may be a second instance of aggregated damage data that is stored at a time after the first instance is stored in the blockchain. In some embodiments, the blockchain may include blocks storing baseline data and/or other data associated with undamaged properties. The blocks may store additional data beyond the aggregated damage data, such as insurance claims, drone-collected damage data, and/or the like. The blocks may facilitate storage of various data associated with a particular damage event in a centralized, secure interface.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may also be used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

In the exemplary embodiment, the DI system further may include an insurance computing device communicatively coupled to the DI computing device and/or the nodes. The insurance computing device may be associated with an insurance provider that provides insurance policies for properties. The insurance computing device may be configured to retrieve the blockchain of a property for review and analysis of damage to the property. In particular, the insurance computing device may retrieve aggregated damage data from the blocks of the blockchain to determine if the property has been damaged and/or to what extent damage has occurred. In one example, the insurance computing device may retrieve the blocks of the blockchain when an insurance claim is filed for the property. The blockchain may provide security and trust for the insurance provider and/or other parties reviewing the damage data in the blocks that the stored data is accurate and has not been modified since storage in the blockchain. In one example, the insurance provider may review aggregated damage data and/or baseline data stored in previous blocks to determine an approximate time and/or cause of the damage.

In certain embodiments, the DI computing device may be configured to notify the insurance provider and/or the insurance policyholder of a property when potential damage to the property is detected. In such embodiments, the DI computing device may provide a recommendation and/or analysis of the aggregated damage data. Notifying the insurance provider and/or the policyholder may reduce the time taken to initiate and resolve an insurance claim for property damage. In one example, the insurance provider may automatically populate an insurance claim with data from the aggregated damage data.

In the exemplary embodiment, the drone fleet may continue to navigate within the geographical region and identify potential damage to properties until the drones reach a low battery power level, the drone fleet has navigated through the entire region, and/or another condition causes the drone fleet to cease its navigation. The drone fleet may navigate to a location identified by the DI computing to await a subsequent deployment.

At least one of the technical problems addressed by this system may include: (i) time-consuming analysis of property damage; (ii) storing damage data in untrusted databases; (iii)

manual control and/or collection of damage data; (iv) extended duration of insurance claim process for property damage; (v) low battery life for aerial or other drones; and/or (vi) acquiring images of damaged properties in view of limited battery power or life.

A technical effect of the systems and processes described herein may be achieved by performing at least one of the following steps: (a) assigning a geographical region to a drone fleet; (b) automatically navigating the drone fleet within the geographical region to detect potential damage to properties; (c) collecting drone-collected damage data with the drone fleet when potential damage to a property is detected; (d) receiving the drone-collected damage data from the drone fleet for the property; (e) generating aggregated damage data associated with the property based at least partially upon the drone-collected damage data; and/or (f) storing the aggregated damage data in a blockchain structure associated with the property for damage assessment.

The technical effect achieved by this system may be at least one of: (i) reducing the time necessary to collect damage data for a property; (ii) increased security and trust of the stored damage data for use in insurance disputes and the like; (iii) automated navigation and collection of damage data using drones; (iv) proactive identification of unreported damage to properties; (v) reduced duration of insurance claim process for property damage; and/or (vi) acquiring images of damaged properties in view of limited battery power or life for aerial or other drones.

Exemplary Damage Identification (DI) System

FIG. 1 depicts an exemplary DI system 100 for identifying property damage of within a geographical region 10. Region 10 may be any suitable size and/or shape. In the exemplary embodiment, geographical region 10 may include a property 15. Property 15 may be a building, a vehicle, and/or any other suitable object that may be insured with an insurance policy from an insurance provider. Region 10 may also include other properties in some embodiments. In the exemplary embodiment, DI system 100 may include a DI computing device 102, a database 103, a drone fleet 104, a blockchain system 106, and/or insurance computing device 108. In other embodiments, system 100 includes additional, fewer, or alternative devices, including those described elsewhere herein. For example, in some embodiments, system 100 may include a plurality of insurance computing devices 108.

DI computing device 102 may include at least one processor 110 and a memory device 112 in communication with processor 110. Memory device 112 may be configured to store computer-executable instructions that, when executed by processor 110, may cause DI computing device 102 to operate as described herein. DI computing device 102 may be configured to identify damage associated with properties within region 10. More specifically, in the exemplary embodiment, DI computing device 102 may be configured to define region 10, instruct drone fleet 104 to collect damage data from properties within region 10, receive the damage data, aggregate the damage data, and store the aggregated damage data in a blockchain. DI computing device 102 may be communicatively coupled to database 103, drone fleet 104, blockchain system 106, and/or insurance computing device 108.

Database 103 may be configured to store data associated with properties. In particular, database 103 may store location data (e.g., GPS coordinates, addresses, etc.) associated with properties within geographical region 10. Database 103 may also store other data associated with region 10 and the properties within, such as, and without limitation, boundaries of region 10, insurance providers associated with the properties, and/or baseline data representing the properties without damage. Although database 103 is shown separately from DI computing device 102, in some embodiments, database 103 may be integrated with DI computing device 102.

Drone fleet 104 may include a plurality of drones 114 communicatively coupled together. Drone fleet 104 may include any suitable number of drones to operate as described herein. Drones 114 may be any suitable land drones, nautical drones, aeronautical drones, and/or combinations thereof. Drones 114 may be autonomous and/or semi-autonomous such that drones 114 automatically perform at least some tasks without direct user input controlling drones 114. In the exemplary embodiment, drone fleet 104 may be communicatively coupled to DI computing device 102 to receive commands or instructions. The commands may cause drone fleet 104 to perform one or more actions, such as navigating within region 10 and collecting data. Drone 114 may communicate with each other to facilitate organized actions and to reduce overlap between drones 114.

In the exemplary embodiment, each drone 114 may include a sensor assembly 116. Sensor assembly 116 may include one or more sensors that are configured to capture sensor data. Sensor data may include, but is not limited to, image data, video data, audio data, temperature data, electrical data, mechanical force data, and/or other data that may be collected by one or more sensors. The sensor data may be used by drones 114 to navigate autonomously within region 10 and/or to identify property damage.

Drone fleet 104 may be configured to capture sensor data associated with property 15 while navigating within geographical region 10 to determine whether or not property 15 is damaged. In the exemplary embodiment, image data and/or video data of property 15 captured by drones 114 may be analyzed to identify damage. Drones 114 may be configured to use any suitable object recognition technique to analyze the image and/or video to identify property 15, the structure and components of property 15, and/or an environment of property 15. Drones 114 may evaluate any damage detected at property 15 using machine learning, neural networks, fuzzy logic, and/or analysis techniques.

When damage is detected at property 15, drone fleet 104 may be configured to position around property 15 to capture drone-collected damage data (i.e., sensor data associated with a damaged property). Drones 114 may be arranged around property 15 at different locations, elevations, and/or angles to facilitate increased coverage of sensor assemblies 116. In one example, drone fleet 104 may be positioned in a dome-like formation around property 15 to collect damage data. The drone-collected damage data may then be transmitted back to DI computing device 102 for processing and/or analysis. In some embodiments, DI computing device 102 may be configured to request additional damage data from drone fleet 104.

In some embodiments, DI computing device 102 may be communicatively coupled to one or more external devices 118 to receive damage data associated with properties within region 10. External device 118 may be, for example, a user computing device (e.g., smartphone, tablet, laptop, wearable electronic, etc.), a sensor system configured to monitor one or more properties in region 10, and/or other devices configured to capture damage data. The damage data may be transmitted to DI computing device 102 for use with the drone-collected damage data.

DI computing device 102 may be configured to generate aggregated damage data for property 15 based upon the various sources of damage data monitoring property 15 (e.g., drone fleet 104 and external device 118). The aggregated damage data may include damage data stored and/or processed in different formats. In one example, the aggregated damage data may include raw damage data (e.g., image data captured by drone 114) and graphical models generated by DI computing device. In other embodiments, the aggregated damage data may include additional, fewer, or alternative damage data and combinations thereof, including those described elsewhere herein.

DI computing device 102 may be configured to store the aggregated damage data in a block of a blockchain structure. The blockchain structure may be stored by blockchain system 106. Blockchain system 106 may be a collection of interconnected nodes that maintain copies of blockchains for subsequent retrieval of data stored within the blockchains. Blockchain system 106 may be configured to prevent alteration of stored blocks, and thus may be regarded as a trusted database for disputes. Moreover, the blocks within a blockchain may be configured to store a various types of data associated with a particular damage event, thereby providing a centralized interface for analysis.

In the exemplary embodiment, insurance computing device 108 may be associated with an insurance provider. In at least one embodiment, insurance computing device 108 may be associated with the insurance provider for the insurance policy of property 15. Insurance computing device 108 may be configured to initiate and/or resolve insurance claims for property damage. Insurance computing device 108 may also be configured to store records associated with insurance policies and/or historical insurance claims to facilitate initiating and/or resolving insurance claims.

In the exemplary embodiment, insurance computing device 108 may be configured to retrieve aggregated damage data from blockchain system 106 for analysis and damage assessment of a property. In particular, insurance computing device 108 may retrieve the aggregated damage data when initiating and/or resolving an insurance claim to determine if property damage has occurred, the potential cause of the damage, and/or the extent of the property damage. Using blockchains to store the aggregated damage data may enable the insurance provider to provide the data as a secure, credible source of information when settling disputes regarding insurance claims. In certain embodiments, insurance computing device 108 may be configured to provide data to blockchain system 106 for storage.

In at least some embodiments, DI computing device 102 may be communicatively coupled to insurance computing device 108 to notify the insurance provider when potential damage is detected within region 10. In response to the notification, insurance computing device 108 may automatically initiate an insurance claim and/or contact the corresponding policyholder to determine if the policyholder wants to initiate an insurance claim. Proactively initiating insurance claims may reduce the time taken between the damage occurring and the insurance claim being resolved. In certain embodiments, external device 118 may be associated with the policyholder, and DI computing device 102 may be configured to notify external device 118 of the damage. In some embodiments, external device 118 may be communicatively coupled to insurance computing device 108 to initiate insurance claims, review data stored by insurance computing device 108 or blockchain system 106, and/or to transmit damage data directly to insurance computing device 108.

Exemplary Data Flow for DI Systems

Figure 2:
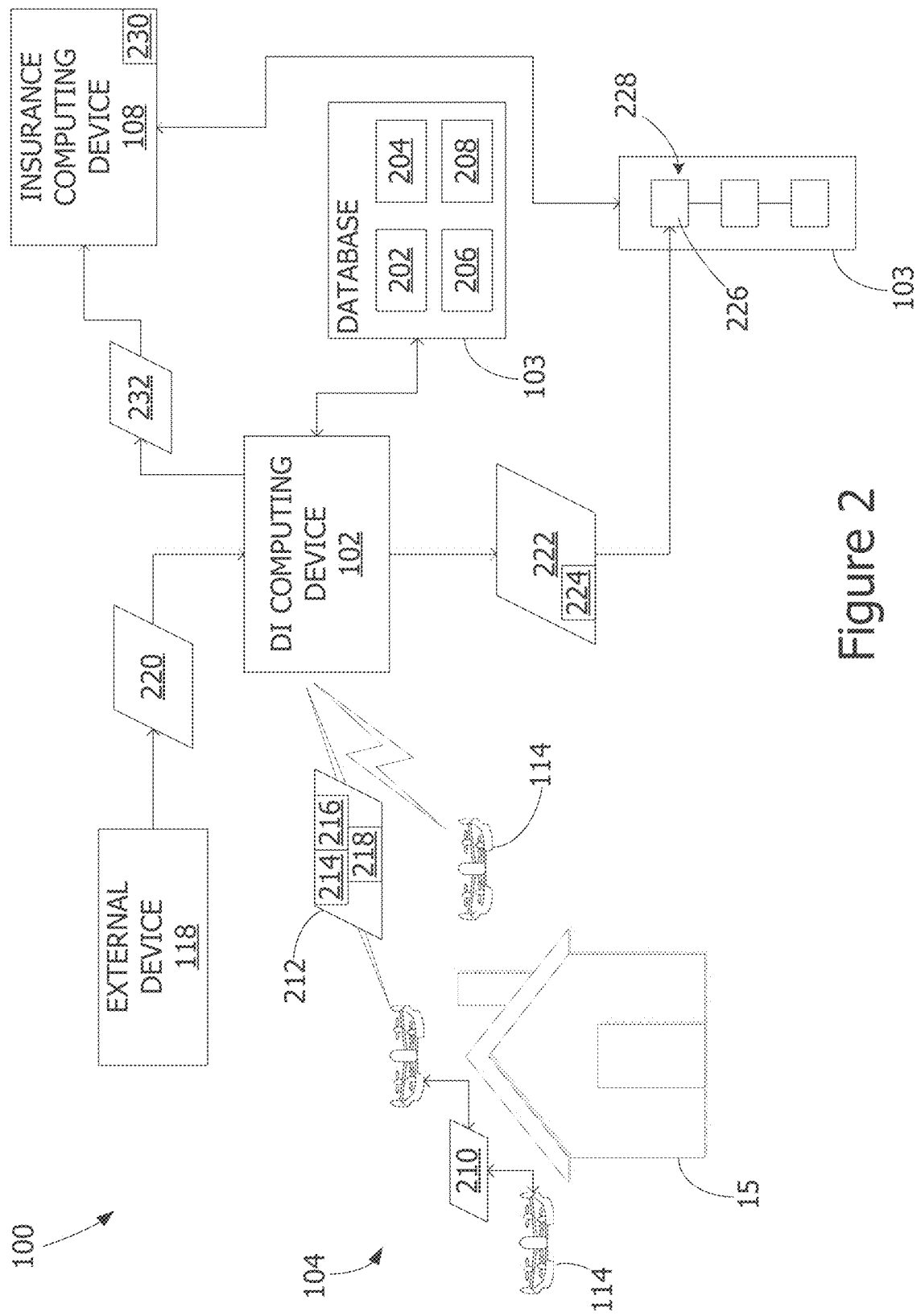
FIG. 2 illustrates a data flow diagram of an exemplary damage assessment process that may be used with the system shown in FIG. 1.

FIG. 2 depicts an exemplary data flow diagram of a damage identification process that may be used with DI system 100 (shown in FIG. 1). In other embodiments, the damage identification process may include additional, fewer, or alternative steps, including those described elsewhere herein.

In the exemplary embodiment, to identify property damage, DI computing device 102 may be configured to define geographical region 10 (shown in FIG. 1). Region 10 may be defined by user input provided by a user at DI computing device 102, using any suitable automated techniques for defining regions, using predefined regions (e.g., city limits, zip codes, etc.), and/or combinations thereof. DI computing device 102 may generate region data 202 associated with region 10 and store region data 202 in database 103. Region data 202 may define one or more bounders, centers, shapes, sizes, corners, and/or other characteristics of region 10 such that devices (e.g., drones 114) may identify the geographical location of region 10.

DI computing device 102 may assign drone fleet 104 to region 10 to detect property damage. In the exemplary embodiment, drone fleet 104 may include a plurality of aeronautical drones 114 that may be configured to capture image and/or video data. DI computing device 102 may transmit region data 202 to drones 114 to assign drones 114 to region 10. In some embodiments, DI computing device 102 may be communicatively coupled to each drone 114 of drone fleet 104 to transmit data to each drone 114. In other embodiments, DI computing device 102 may be communicatively coupled to at least one drone 114 such that drones 114 distribute data from DI computing device 102 between each other.

DI computing device 102 may transmit other data and/or instructions to drones 114 to facilitate identifying property damage. In one example, DI computing device 102 may transmit a list of insured properties 204 to drone fleet 104. List 204 may include location data for properties within region 10 that are associated with insurance policies of a particular insurance provider (e.g., the insurance provider associated with DI computing device 102 and/or insurance computing device 108). In some embodiments, list 204 may be transmitted with baseline data 206 representing properties within region 10 in an undamaged state. Baseline data 206 may be used to compare to a current state of the properties to determine if any damage has occurred. DI computing device 102 may also transmit one or more predetermined damage thresholds 208 to drones 114 for evaluating damage as described herein. In the exemplary embodiment, list 204, baseline data 206, and/or damage thresholds 208 may be stored in database 103.

In response to being assigned to region 10, drone fleet 104 may navigate within region 10 and collect sensor data. Drones 114 may communicate navigation data 210 with each other to prevent collisions between drones 114 and/or to move through region 10 in an organized formation. Navigation data 210 may include, but is not limited to, a current position of each drone 114, a destination of drone 114, a distance between drone 114 and one or more other drones in drone fleet 104, a designated position within a formation of drone fleet 104, and/or flight path data (i.e., a path travelled by drone 114). In certain embodiments, a formation of drone fleet 104 may be determined by receiving instructions from DI computing device 102, retrieving a predefined formation from memory, and/or adapting to the current capabilities of drones 114 and/or the current environment of drone fleet 104. For example, if relatively strong winds are impacting drone fleet 104, drones 114 may be organized in a formation that may reduce the risk of collision if drones 114 are impacted by the winds.

In some embodiments, when drone fleet 104 has received list 204, drone fleet 104 may be configured to generate a navigation path based at least partially upon the location data within list 204. Drone fleet 104 may be configured to use any suitable navigation and/or formation techniques to facilitate automatic navigation within region 10.

While drone fleet 104 is deployed, each drone 114 may collect sensor data to identify properties within region 10. In the exemplary embodiment, drones 114 may be configured to capture image data (such as either 2D or 3D image data) and/or video data, and analyze the captured data using suitable object recognition techniques to identify properties. When a property is identified, sensor data associated with the property may be collected by drones 114 and evaluated to identify any potential damage. Drones 114 may communicate the evaluations to each other to establish a damage consensus that represents a collective evaluation of the property damage. That is, the damage consensus may indicate whether or not damage to the property has occurred and/or to what extent the damage has occurred. The damage consensus may be qualitative and/or quantitative. In some embodiments, drone fleet 104 may compare the damage consensus to threshold 208 to determine if the damage is sufficient enough to transmit sensor data to DI computing device 102.

In the exemplary embodiment, property damage may be detected at property 15. Drone fleet 104 may be configured to position in several different locations around property 15 to facilitate increased coverage of property 15. In one example, drones 114 are arranged in a dome-like formation around property 15. In some embodiments, navigation data 210 may be transmitted between drones 114 to coordinate where each drone 114 is positioned, what data each drone 114 may collect, and/or other information to organize drones 114. Drones 114 may then capture drone-collected damage data 212 associated with property 15. Drone-collected damage data 212 is sensor data associated with potential damage. Drone-collected damage data 212 may include a timestamp 214, a location identifier 216, and/or a property identifier 218. Timestamp 214 may indicate the time at which drone-collected damage data 212 was collected. Location identifier 216 may indicate a location of drone 114 and/or a location of property 15. Property identifier 218 may identify property 15 to facilitate organization of drone-collected damage data 212 by DI computing device 102 and/or database 103 based upon the associated property.

In other embodiments, drone-collected damage data 212 may include additional, fewer, or alternative data, including data described elsewhere herein. For example, drone-collected damage data 212 may include a signature that identifies which drone 114 collected drone-collected damage data 212. Drone-collected damage data 212 may be transmitted to DI computing device 102 for analysis. In some embodiments, drones 114 may communicate drone-collected damage data 212 with each other to verify the quality of the data and/or to determine if a sufficient amount of drone-collected damage data 212 for property 15 has been collected.

DI computing device 102 may receive drone-collected damage data 212 from each drone 114. In some embodiments, DI computing device 102 may receive external damage data 220 associated with property 15 from one or more external devices 118. DI computing device 102 may be configured to aggregate drone-collected damage data 212, external damage data 220, and/or other damage data associated with property 15 to generate aggregated damage data 222. Aggregated damage data 222 may include, but is not limited to, raw damage data (i.e., drone-collected damage data 212 and/or external damage data 220 as received by DI computing device 102), data generated by analyzing the received damage data, and/or models generated at least partially as a function of the received damage data. In one example, aggregated damage data 222 includes a 3D model 224 of property 15. Model 224 is a graphical model that combines image data from multiple drones 114. DI computing device 102 may "stitch" or interpolate the image data together to form model 224 using any suitable image analysis techniques.

DI computing device 102 may store aggregated damage data 222 in a block 226 of a blockchain 228 associated with property 15 in blockchain system 106. In particular, DI computing device 102 may store aggregated damage data 222 in a new block 226 of blockchain 228. In the exemplary embodiment, blockchain 228 may be set of historical records of property 15. In some embodiments, each block 226 may be associated with a respective instance of damage data collected by system 100 for property 15 such that damage to property 15 may be tracked and recorded over time. In other embodiments, at least some blocks 226 may include data associated with property 15 in an undamaged state. Blocks 226 may be linked in series with each other and may be configured to prevent alteration of data stored in blockchain 228. Blockchain 228 may be copied and/or distributed to several nodes (not shown) within blockchain system 106.

Insurance computing device 108 may be configured to initiate and/or resolve insurance claims associated with property damage. In the exemplary embodiment, insurance computing device 108 may retrieve aggregated damage data 222 from blockchain 228 when resolving an insurance claim 230 associated with damage to property 15. Aggregated damage data 222 may be used to assess if damage has occurred to property 15, a cause of the damage, and/or the extent of damage to property 15.

In some embodiments, DI computing device 102 may be configured to transmit a damage notification 232 to insurance computing device 108 when DI computing device 102 determines property 15 is potentially damaged. In response to damage notification 232, insurance computing device 108 may automatically initiate insurance claim 230 or contact a policyholder associated with an insurance policy of property 15 to initiate claim 230.

Exemplary User Computing Device

Figure 3:
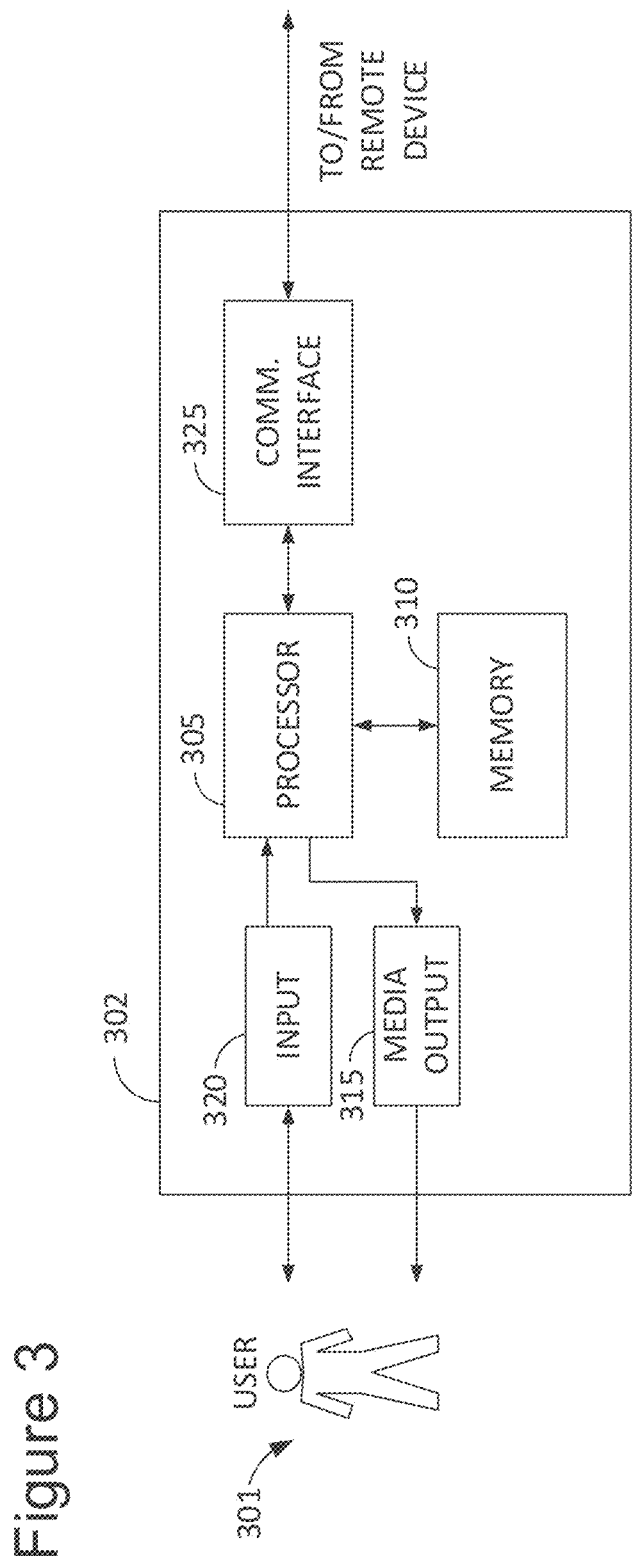
FIG. 3 illustrates an exemplary configuration of a user computer device, in accordance with one embodiment of the present disclosure.

FIG. 3 depicts an exemplary configuration of a user computing device, in accordance with one embodiment of the present disclosure. User computing device 302 may be operated by a user 301. User computing device 302 may include, but is not limited to, DI computing device 102, insurance computing device 108, and external device 118 (all shown in FIG. 1). User computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

User computing device 302 may also include at least one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, an interface for viewing aggregated damage data 222 (shown in FIG. 2). In some embodiments, user computing device 302 may include an input device 320 for receiving input from user 301. User 301 may use input device 320 to, without limitation, initiate claim 230 and/or provide instructions to drone fleet 104 (both shown in FIG. 2).

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computing device 302 may also include a communication interface 325, communicatively coupled to a remote device such as DI computing device 102. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from DI computing device 102 and/or insurance computing device 108. A client application may allow user 301 to interact with, for example, insurance computing device 108. For example, instructions may be stored by a cloud service, and the output of the execution of the instructions may be sent to the media output component 315.

Exemplary Host Computing Device

Figure 4:
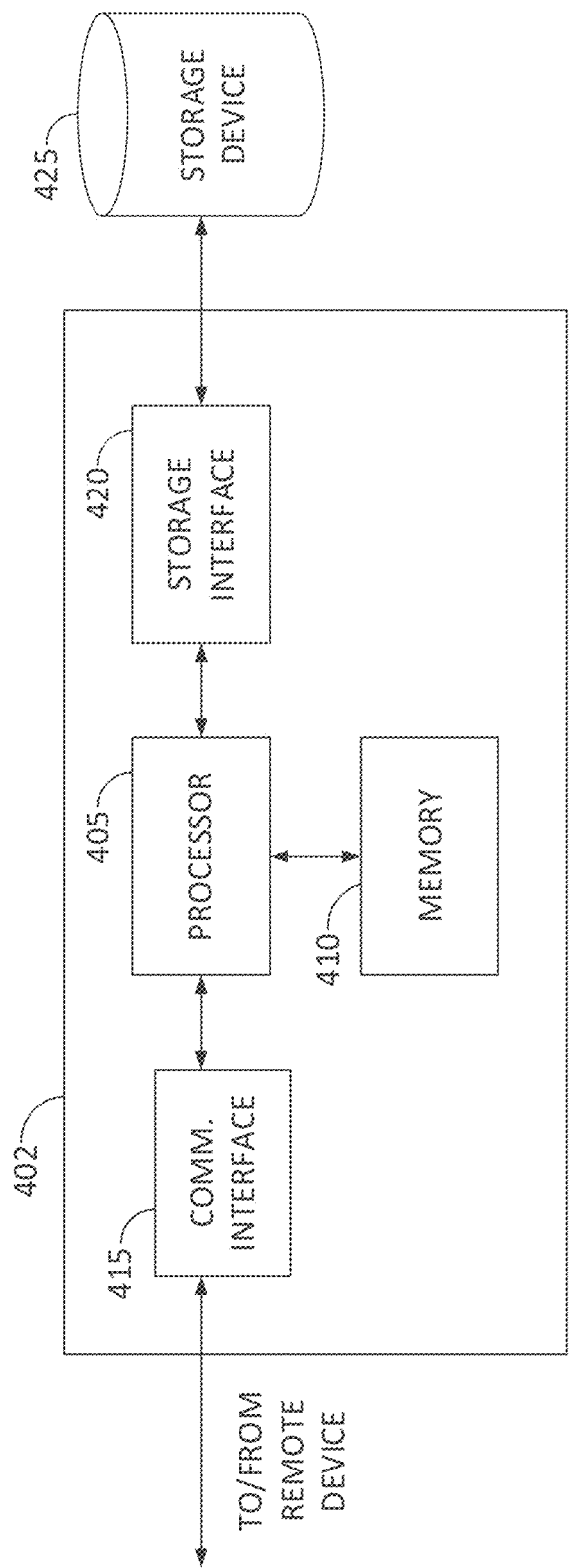
FIG. 4 illustrates an exemplary configuration of a host computing device, in accordance with one embodiment of the present disclosure.

FIG. 4 depicts an exemplary configuration of a host computing system, in accordance with one embodiment of the present disclosure. Host computing device 402 may include, but is not limited to, DI computing device 102 and insurance computing device 108 (both shown in FIG. 1). Host computing device 402 may also include a processor 405 for executing instructions. Instructions may be stored in a memory area 410. Processor 405 may include one or more processing units (e.g., in a multi-core configuration).

Processor 405 may be operatively coupled to a communication interface 415 such that host computing device 402 is capable of communicating with a remote device, such as another host computing device 402 and/or a user computing device 302 (shown in FIG. 3), for example, using wireless communication or data transmission over one or more radio links or digital communication channels. For example, communication interface 415 may receive drone-collected damage data 212 as illustrated in FIG. 2.

Processor 405 may also be operatively coupled to a storage device 425. Storage device 425 may be any computer-operated hardware suitable for storing and/or retrieving data, such as, but not limited to, data associated with database 103 and/or blockchain system 106 (both shown in FIG. 1). In some embodiments, storage device 425 may be integrated in host computing device 402. For example, host computing device 402 may include one or more hard disk drives as storage device 425.

In other embodiments, storage device 425 may be external to host computing device 402 and may be accessed by a plurality of host computing devices 402. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Processor 405 may execute computer-executable instructions for implementing aspects of the disclosure. In some embodiments, the processor 405 may be transformed into a special purpose microprocessor by executing computer-executable instructions or by otherwise being programmed. For example, the processor 405 may be programmed with instructions such as illustrated in FIG. 5.

Exemplary Computer-Implemented Method for Identifying Property Damage

Figure 5:
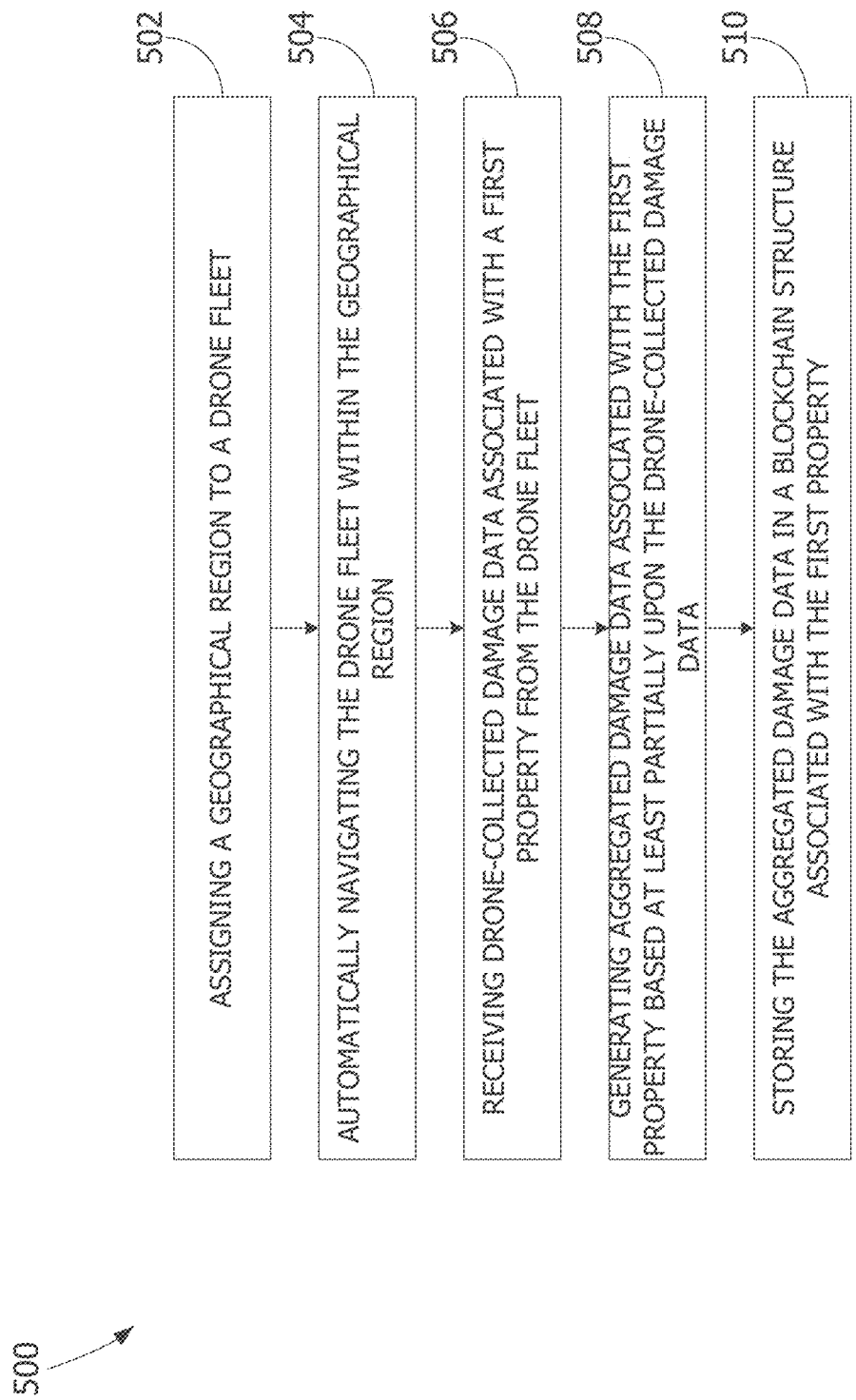
FIG. 5 illustrates a flow diagram of an exemplary computer-implemented method for assessing property damage that may be used with the system shown in FIG. 1.

FIG. 5 depicts an exemplary computer-implemented method 500 for identifying property damage that may be used with system 100 (shown in FIG. 1). Method 500 may be at least partially performed by DI computing device 102 (shown in FIG. 1). In certain embodiments, method 500 may be at least partially performed by another computing device, such as insurance computing device 108 (shown in FIG. 1). In other embodiments, method 500 may include additional, fewer, or alternative steps, including those described elsewhere herein.

With respect to FIGS. 1 and 5, method 500 may begin with DI computing device 102 assigning 502 geographical region 10 to drone fleet 104. In some embodiments, DI computing device 102 may transmit region data defining region 10 to drone fleet 104. Drone fleet 104 may automatically navigate 504 within region 10 and collect sensor data to detect any damaged property. When drone fleet 104 identifies potentially damaged property, such as damaged homes, buildings, vehicles, or boats, drone fleet 104 may be positioned around the damaged property to collect damage data. The drone-collected damage data may be transmitted to DI computing device 102.

DI computing device 102 may receive 506 the drone-collected damage data associated with the damaged property and generate 508 aggregated damage data associated with the damaged property based at least partially upon the drone-collected damage data. DI computing device 102 may then store 510 the aggregated damage data in a blockchain structure associated with the damaged property to maintain a secure record of damage to the property for use in resolving property damage insurance claims.

Exemplary Computing Device

Figure 6:
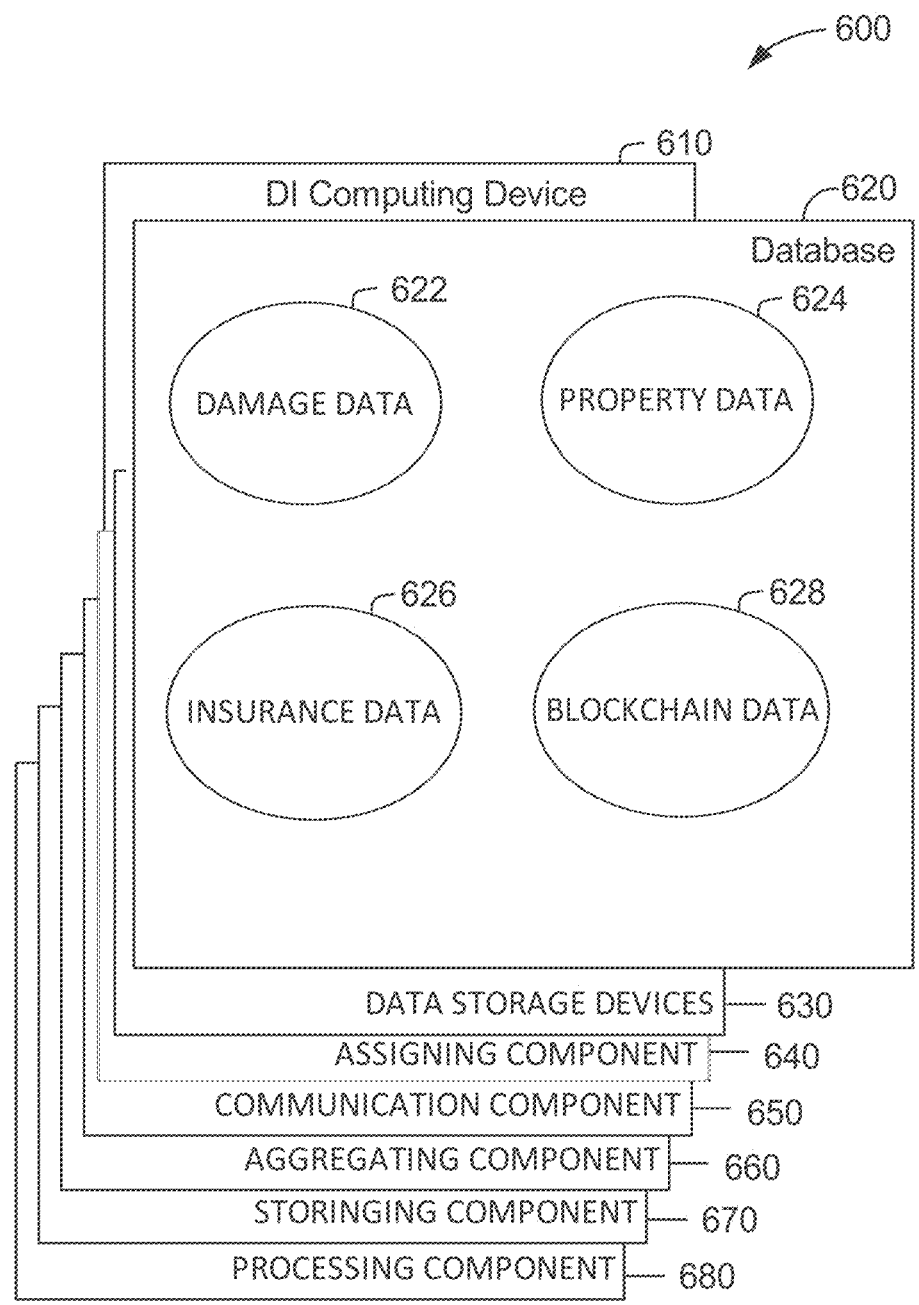
FIG. 6 illustrates a diagram of components of one or more exemplary computing devices that may be used in the system shown in FIG. 1.

FIG. 6 depicts a diagram 600 of components of one or more exemplary computing devices 610 that may be used in system 100 shown in FIG. 1. In some embodiments, computing device 610 may be similar to DI computing device 102 (shown in FIG. 1). Database system 620 may be coupled with several separate components within computing device 610, which perform specific tasks. Database system 620 may include a plurality of distributed databases that store specific types of data, such as database 103 and/or blockchain system 106 (both shown in FIG. 1). In this embodiment, database system 620 may include damage data 622, property data 624, insurance data 626, and/or blockchain data 628.

With respect to FIGS. 5 and 6, computing device 610 may include database system 620, as well as data storage devices 630. Computing device 610 may include an assigning component 640 for assigning 502 a geographical region to a drone fleet to monitor. Computing device 610 may also include a communication component 650 for receiving 506 drone-collected damage data associated with a property from the drone fleet. Computing device 610 may further include a generating component 660 for generating 508 aggregated damage data associated with the property based at least partially upon the drone-collected damage data of the property. Computing device 610 may include storing component 670 for storing 510 the aggregated damage data in a blockchain structure associated with the property for subsequent damage assessment. A processing component 680 may assist with execution of computer-executable instructions associated with the system.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as drone, autonomous or semi-autonomous drone, image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

EXEMPLARY EMBODIMENTS

Figure 7:
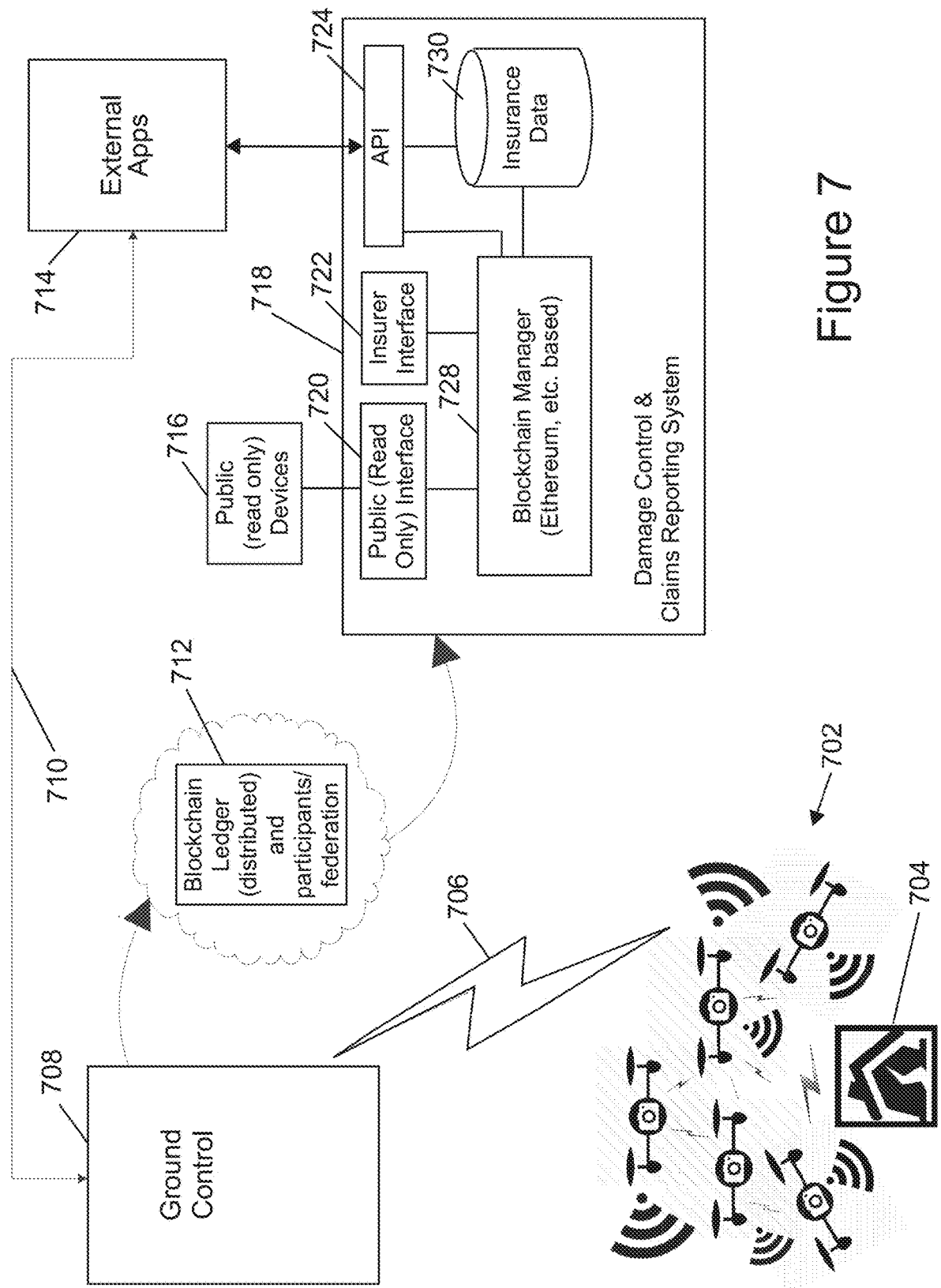
FIG. 7 illustrates exemplary blockchain-based drone fleet claims evaluation.
Figure 8:
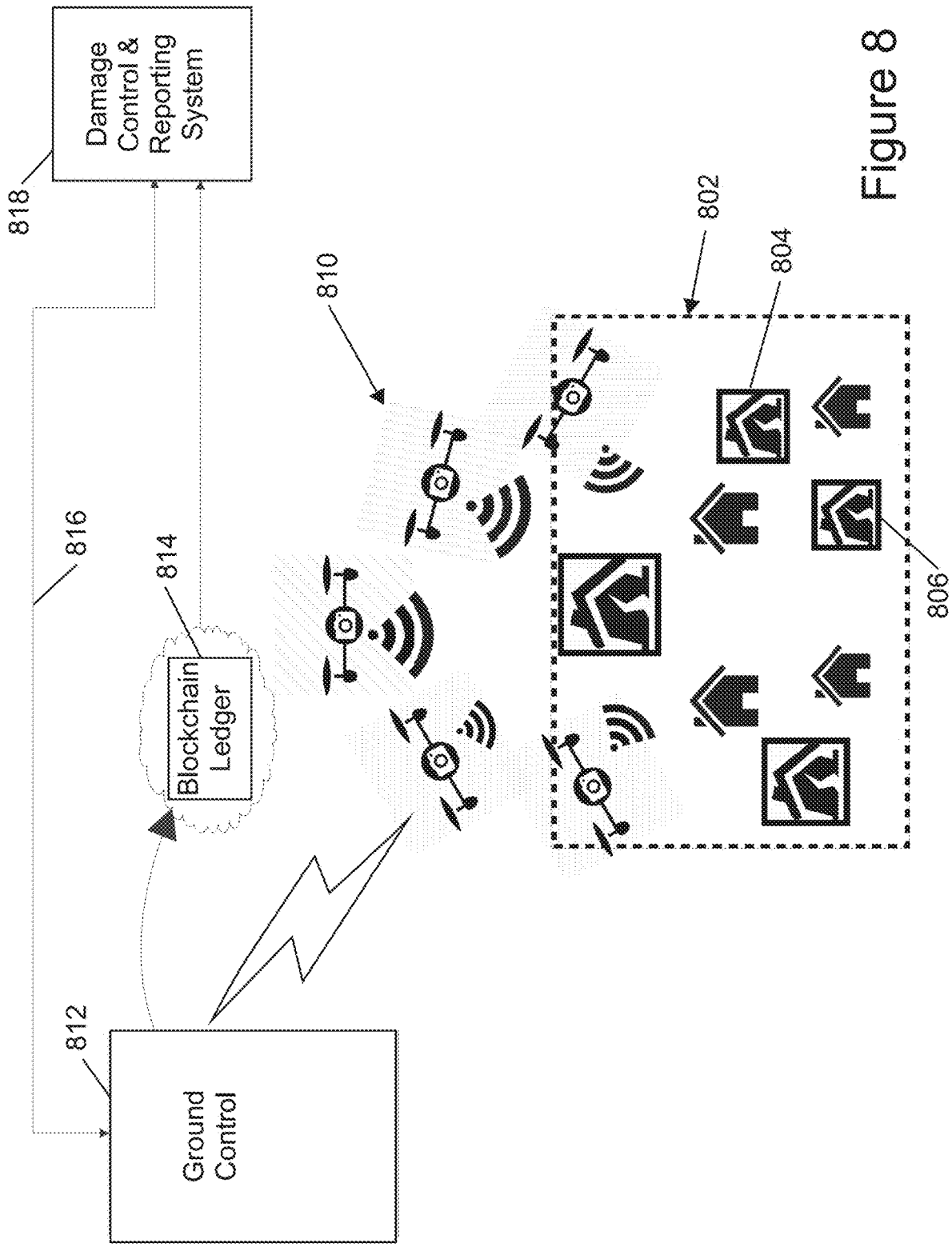
FIG. 8 illustrates exemplary drone fleet general operation with ground control.
Figure 9:
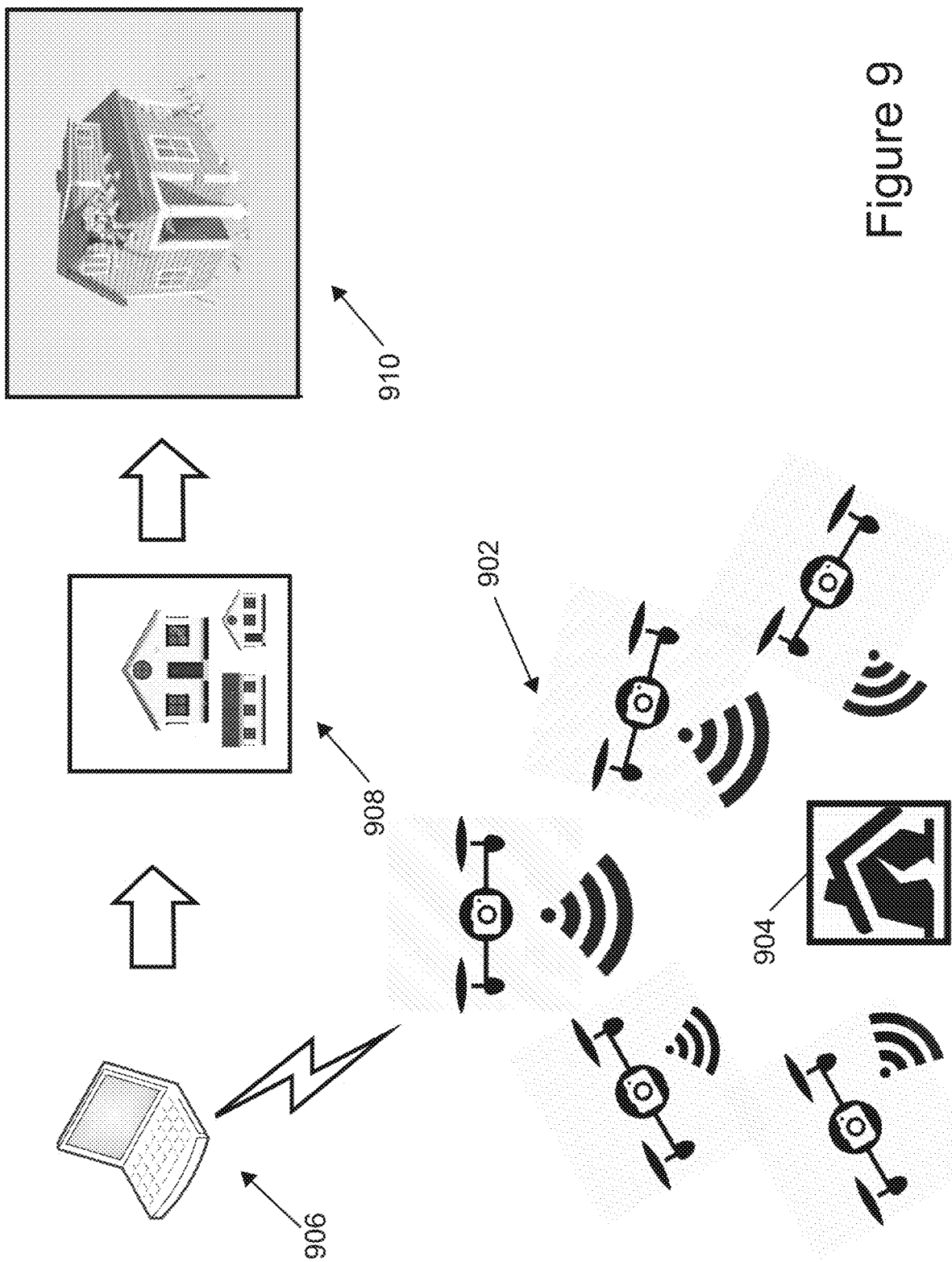
FIG. 9 illustrates exemplary drone fleet arrangement and photo stitching to depict a 3D model of an insured property.

In addition to the foregoing embodiments, additional exemplary embodiments are depicted by FIGS. 7-11. FIG. 7 illustrates exemplary blockchain-based drone fleet claims evaluation; FIG. 8 illustrates exemplary drone fleet general operation with a DI computing device; and FIG. 9 illustrates exemplary drone fleet arrangement and photo stitching to depict a 3D model an insured property.

As depicted by FIGS. 7-9, autonomous drone fleets of relatively small, inexpensive drones may be deployed using software that enables the drones to operate in fleets from a few to hundreds (i.e., a "swarm"). These drone fleets may be controlled by software that enables the drones to communicate with each other, and once given a task (e.g., finding a vehicle or home in an geographical area or road), the drones may navigate and communicate using a fuzzy algorithm and/or other suitable distributed resource techniques to self-organize as a unit to find the best formation and movement pattern. The drones may also be programmed via machine learning techniques to identify patterns, such as building structure or vehicle (auto or boat, for example) damage, vehicle accidents, and crop damage, among many other scenarios.

A drone "command" from pilot operators (e.g., a user managing the drone fleet from the DI computing device and/or a device in communication with the DI computing device) may, for example, take the form of: find all geolocations (i.e., properties) within a geographical regions, and if damage is found at the geolocations, form a stationary array and photograph the damaged property. Further, commands may include return to the flight starting point when the area is assessed, and/or before battery drainage reaches a threshold.

The present embodiments may include directing autonomous drone fleets (which may or may not be aided by traditional piloted drones) to search out automatically for damages (particularly damaged property) within an area to facilitate proactive initiation of a claim by an insured, and photograph the area, buildings, vehicles, and/or other properties within the area. The drones may have onboard computers that allow them to self-organize for the most optimal flight formation and flying path. The drones may collect sensor data (e.g., image or video data) of properties (including homes and vehicles) while navigating to detect damage. The drones may use object recognition, machine learning algorithms, data comparison, and/or the like to identify damage to properties. In some embodiments, the drone fleet may only collect sensor data and determine damage for properties with a geolocation matching a list of properties of interest within a geographical region, such as properties covered by insurance policies provided by a particular insurance provider.

In at least some embodiments, the drones may store data associated with an undamaged property and compare the data to the sensor data collected by the drones to determine whether or not the property may be damaged. The undamaged property may be data previously collected for the potentially damaged property or a substantially similar property. In certain embodiments, the data associated with the undamaged property may be provided to the drone fleet by an insurance provider and/or other third party. In such embodiments, damage thresholds may be established to translate a comparison between the undamaged property data and the sensor data to a determination of damage. That is, a result of the comparison, specifically a quantitative result of the comparison, may be compared to one or more damage thresholds to determine whether or not the property is damaged. In one example that damage threshold may be greater than or equal to 50% loss or damage. The drones may augment the comparison using machine learning (for example, identifying a hole in a roof, a tree on the property, broken home or vehicle windows, a tree or other debris on top a vehicle, or a partially missing or obliterated property) to identify the damage to the property.

When the drone fleet determines that a property is damaged, the drones may automatically arrange in a manner enabling them to quickly take photos and/or other sensor data from various angles, heights, and/or elevations (e.g., in a dome shape at multiple spatial arrangements). If no damage is detected, the drone fleet may move on to evaluate the next property, such as to save battery life, or gather as many photos of damaged properties as possible given limited battery life.

Those photos may be sent back to a DI computing device during collection or downloaded upon the drone fleet landing or otherwise docking. The DI computing device may be a computing device communicatively coupled to one or more drones within the drone fleet. The DI computing device may receive data from the drone fleet, analyze the data, store the data (e.g., in a blockchain), and/or provide instructions to the drone fleet. In certain embodiments, the DI computing device may receive sensor data from the drone fleet and determine if a property is damaged or not based at least partially upon the sensor data. In some embodiments, the DI computing device may be a mobile computing device (e.g., a laptop, a tablet, a smartphone, etc.) that is deployed at or near the geographical region navigated by the drone fleet. The DI computing device may be operated by insurance personnel of an insurance provider and/or a first responder, for example. In other embodiments, the DI computing device may be remotely located from the geographical region.

In one scenario, if an area has been damaged by a natural disaster, such as hurricane, fire, wild fire, super storm, high winds, storm surge, or tornado, it may not be known immediately to insurance personnel (or first responders) the exact extent of the damage for each home. A drone fleet with machine learning capabilities may seek out damaged homes and areas within certain boundaries or along map features (e.g., roads). The DI computing device may assist the drones in navigating, identifying damage, storing damage data, and/or analyzing the damage data as described herein. Drone fleets working in coordination may cover more area, and complete the sensing and photography tasks much faster than traditional single unit drones or analysis performed manually by people. The automated collection of sensor data and identification of damage may aid those responsible for finding damaged homes and/or areas by making the process more efficient.

In the exemplary embodiment, the DI computing device may receive photos and/or other damage data from the drone fleet of a damaged property for analysis and storage. Images captured by the drones may be post-processed using 3D imagery or image "stitching" software. In at least some embodiments, the post-processing may be performed by the drones. In other embodiments, the post-processing may be performed by the DI computing device. Alternatively, a different computing device in communication with the drones and/or the DI computing device may perform the post-processing. A 3D model generated using the post-processed image data from the drones may facilitate analysis of the damage to a property in a unified interface. After which, the 3D model may be uploaded with a timestamp, geodata, and/or a policy number to a blockchain (or location hashed as appropriate) associated with the damaged property. In other embodiments, pointers or markers associated with the 3D model are stored in the blockchain such that the 3D model is retrievable using the stored pointers.

The blockchain may be used to set up an immutable record of an insurance claim or property history. In at least some embodiments, a claims process may be triggered when damage data is stored in the blockchain of a property, thereby reducing the time between the damage occurring and initial of the insurance claim for the damage. It may be possible to pay insurance claims automatically or find, assess, and process claims more quickly using the damage data collected by the drones.

Drone fleets may be substantially faster than a single drone or other manual data collection techniques. The time savings provided by the present embodiments may be substantial over existing technology, and may facilitate pre-claims surveys for insurance claims to be done relatively quickly. Data associated with a damaged property, such as damage data collected by the drone fleet, may be stored in the blockchain associated with the damaged property with a timestamp. Post-claim drone fleet surveys (i.e., damage data and/or other data collected by the drone fleet after an insurance claim has been filed by an insured) may also be entered into the blockchain. Data associated with damage to the property may be compared with data associated with a non-damaged state of the property. In the exemplary embodiment, both sets of data may be stored in the blockchain in different blocks. In other embodiments, the sets of data may be stored in another suitable configuration, such as in separate blockchains or in the same block. The present embodiments may also be used to evaluate any property, from homes to commercial buildings to crop and timber land. The present embodiments may also incorporate drone fleets with machine learning of damaged/undamaged homes.

Further, the drones may be given instructions to find damaged or undamaged homes from a list of known insurer address (geocoded data) in a particular geographical region (e.g., a 10 hectare grid square). Images of undamaged homes may be used, at least in part, to provide homeowners insurance quotes to potential customers. Images of undamaged homes owned by current insureds/customers may be used to adjust the premiums and/or discount on the properties, and to better match insurance premium to actual risk associated with a property, such as to reward homeowners that are risk averse and take recommended precautions that mitigate risk of damage.

FIG. 7 illustrates an exemplary DI system for identifying property damage in a geographical region. In the example embodiment, the DI system includes drone fleet 702 surveying property 704 to detect damage using imaging sensors. Drone fleet 702 transmits collected data 702 wirelessly to ground control 708. Ground control 708 transmits data, such as hashed images, file links, geocodes, and signatures, as blockchain block 712 to damage control and claims reporting system 718. Damage control and claims reporting system 718 includes insurance data 730 and a blockchain manager 728. Damage control and claims reporting system 718 further includes API 724, in communication with external apps 724, insurer interface 722, and public interface 720 in communication with public devices 716. External apps 714 is in communication with ground control 708 using link 710, such that external apps 718 includes blockchain based drone fleet claims evaluation. For example, an external app may retrieve a drone image from ground control 708 associated with claim evaluation.

FIG. 8 illustrates an exemplary DI system including a drone fleet in communication with ground control. Drone fleet 810 is configured to inspect and/or assess properties within geofence area 802, such as property 804 and 806. Drone fleet 810 is further configured to transmit collected data to ground control 812, such as hashed images, file links, geocodes, and the like. Ground control 812 is configured to store the collected data in blockchain ledger 814, as a blockchain block, and transmit the blockchain block to damage control and reporting system 818. Damage control and reporting system 818 includes link 816 to retrieve collected data (e.g., images, files) and to generally operate ground control 812 (e.g., set geofence area 802).

FIG. 9 illustrates an exemplary DI system including drone fleet arrangement and photo stitching to depict a 3D model of an insured property. In the example embodiment, drone fleet 902 self-arranges via programmed controls to get multiple photos (e.g., multi-level dome formation around property, providing photos at different angles) of property 904. Drone fleet 902 further transmits collected data to ground control 906. Ground control 906 is further configured to generate multiple models of an insured property (e.g., property 904), such as 2D model 908 and 3D model 910.

Figure 10:
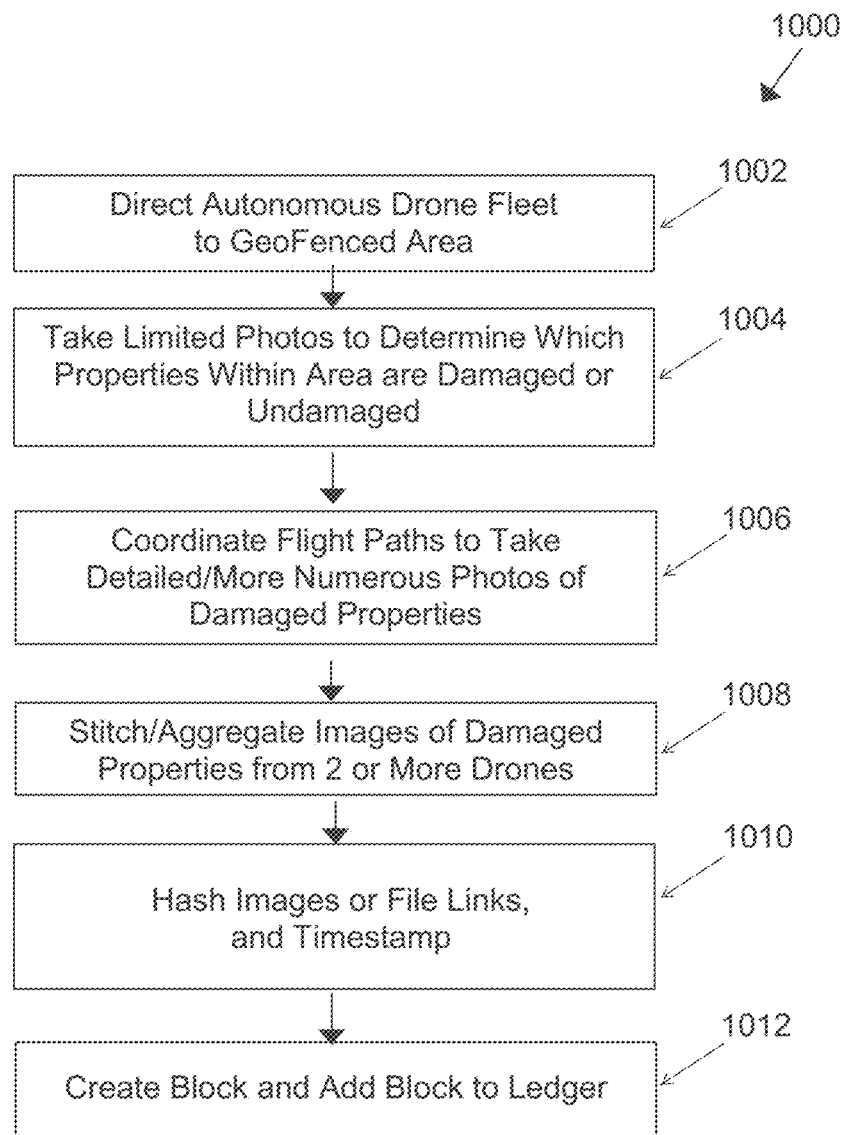
FIG. 10 illustrates an exemplary computer-implemented method of using autonomous or semi-autonomous drone fleets to capture drone image data, and/or then aggregate drone image data from two or more drones of damage properties to facilitate damage assessment.

FIG. 10 illustrates a computer-implemented method 1000 of using autonomous or semi-autonomous drone fleets to capture drone image data, and/or then aggregate the drone image data from two or more drones of damaged properties to facilitate damage assessment. The method 1000 may include directing the drone fleet, via one or more local or remote processors, to (i) autonomously navigate 1002 to a geo-fenced area; (ii) autonomously take 1004 a limited number of photos, and analyze the photos to determine which properties within the area are damaged or undamaged; and/or (iii) coordinate 1006 the flight paths of several drones to autonomously take more detailed and/or more numerous photos of damaged properties. The method may further include, via the drones and/or one or more local or remote processors, (iv) stitching and/or aggregating 1008 images of each damaged properties, the images being collected by two or more autonomous drones; (v) hashing 1010 the images or file links, and timestamps; and/or (vi) creating 1012 a new block with the hashed information, and adding the new block to a blockchain ledger associated with a damaged property. In some embodiments, the new block may be added after several nodes within a communication network form a consensus to add the new block to the ledger. The method may include additional, less, or alternate actions, including those discussed elsewhere herein.

Figure 11:
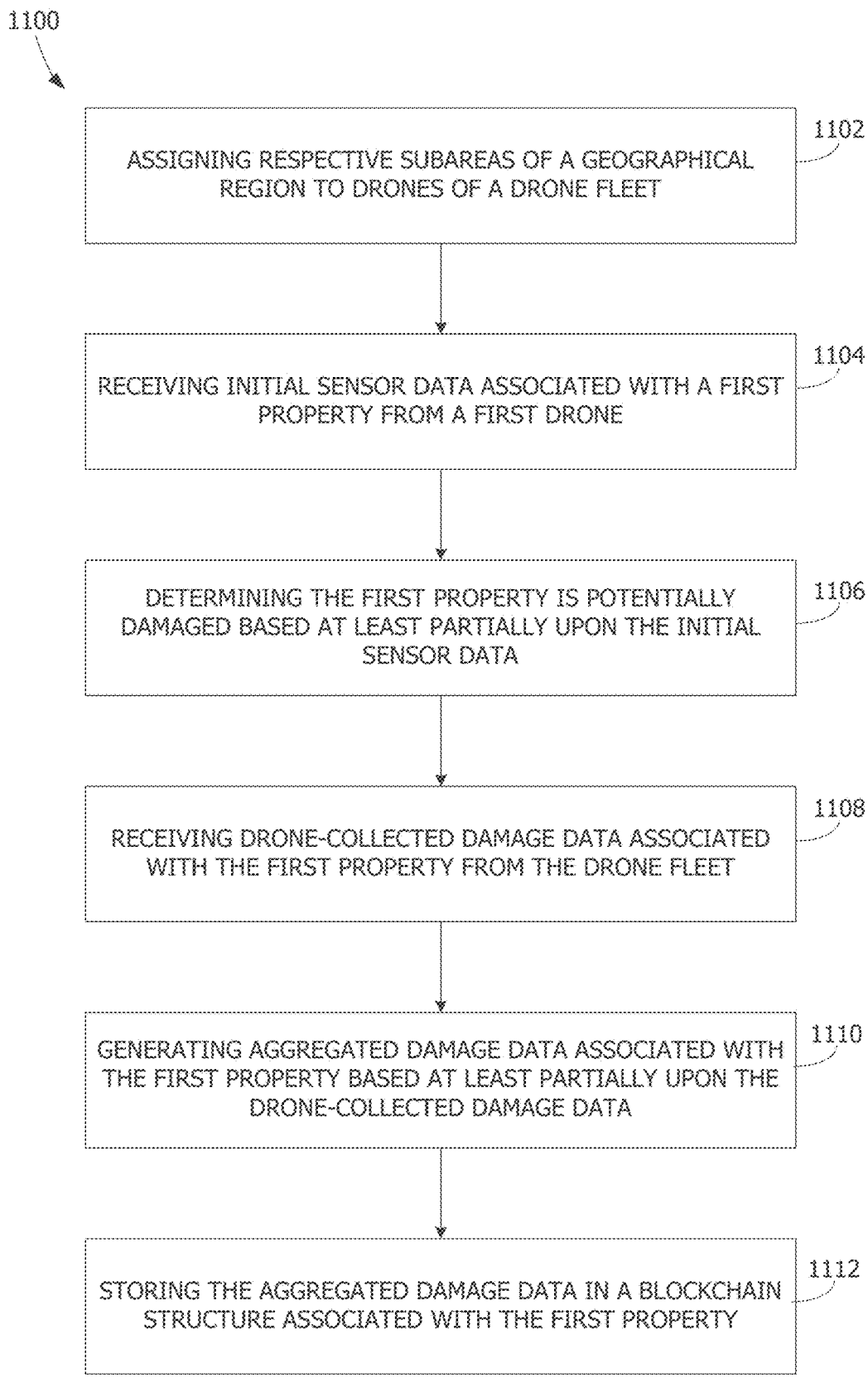
FIG. 11 illustrates an exemplary computer-implemented method of determining damage within a plurality of subareas of a geographical region that may be used with the system shown in FIG. 1.

FIG. 11 illustrates a computer-implemented method 1100 of identifying property damage in a geographical region that may be used by a DI system, such as system 100 (shown in FIG. 1). Method 1100 may be at least partially performed by a DI computing device and/or a drone fleet communicatively coupled to the DI computing device.

In the exemplary embodiment, the DI computing device may assign a geographical region to a drone fleet to navigate through and identify damaged properties. In particular, the DI computing device may assign 1102 a respective subarea of the geographical region to each drone of the drone fleet. That is, the DI computing device may divide the geographical region into a plurality of subareas for navigation and detection of damaged properties. In some embodiments, multiple drones may be assigned to a single subarea. In other embodiments, a drone may be assigned to multiple subareas. For example, a drone may be assigned to following a path through multiple subareas.

The drones may be configured to automatically divide up and navigate to the respective subareas to collect sensor data. The drones may work in parallel with each other to reduce the time taken to navigate through the geographical region, thereby reducing the required energy consumption of the drones to analyze the geographical region. In some embodiments, the DI computing device transmits a list of properties within the assigned subarea to each drone that identifies a location of the properties. The list of properties may be used to facilitate navigation by the drones through the various subareas. The drones may detect properties within the assigned subareas and collect initial sensor data of the properties. The initial sensor data may be used to identify potential damage to the properties. In at least some embodiments, the initial sensor data may be transmitted to the DI computing device for damage analysis. In certain embodiments, the drones may also transmit geolocation data to the DI computing device such that the DI computing device may associate the initial sensor data to a particular location. In other embodiments, the drone may be configured to perform the damage analysis.

The DI computing device may receive 1104 the initial sensor data associated with a first property and determine 1106 that the first property is potentially damaged as described herein (e.g., comparing the initial sensor data to data associated with the first property in an undamaged state). If the DI computing device and/or the drone determines substantially no damage has occurred at the property, the drone may continue navigating within the subarea until another property is detected, navigate to another subarea, navigate to a docking station for charging, and/or the like. When it is determined that the first property (such as a home or vehicle) is damaged, the DI computing device may notify the rest of the drone fleet.

In at least some embodiments, the DI computing device may transmit the geolocation data associated with the first property to the drone fleet. In other embodiments, the drone that collected the initial sensor data may broadcast its location to other drones. The drones may automatically navigate to the first property to collect damage data. The drones may store their current location prior to navigating to the first property such that the drones may resume their navigation of their respective subareas and collection of initial sensor data after collecting the damage data.

When the drones arrive at the first property, the drones may communicate with each other to position around the first property to collect the damage data and transmit the damage data to the DI computing device for analysis. The DI computing device may receive 1108 the drone-collected damage data associated with the first property from the drone fleet and generate 1110 aggregated damage data associated with the first property based at least partially upon the drone-collected damage data. In one example, the damage data may include image data of the first property captured by the drones, and the aggregated damage data may include a 3D model that is created by "stitching" or combining the image data from the drones together.

The DI computing device may store 1112 the aggregated damage data and/or other data relevant to the first property in a blockchain structure (e.g., a block) associated with the first property. The blockchain may be used as a centralized, immutable record of damage and/or insurance claims associated with at least the first property.

In one aspect, a damage identification (DI) system for identifying property damage may be provided. The DI system may include: a drone fleet comprising two or more drones communicatively coupled together (such as via wireless communication or data transmission over a radio frequency link or communication channel), wherein each drone is configured to collect damage data, including image data, and each drone is configured to operate autonomously or semi-autonomously; and a DI computing device comprising at least one processor and a memory communicatively coupled to the at least one processor, wherein the at least one processor is programmed to: (1) assign a geographical region to the drone fleet, and/or determine a flight path to the geographical region for the drone fleet, wherein the drone fleet is configured to automatically navigate to, and then within, the geographical region to detect potential damage to properties; (2) receive drone-collected damage data associated with a first property within the geographical region from the drone fleet when the drone fleet determines the first property is potentially damaged from analysis of drone data collected by one or more drones; (3) generate aggregated damage data associated with the first property based at least partially upon damage data collected by two or more drones; and/or (4) store the aggregated damage data in a blockchain structure associated with the first property for damage assessment of the first property. The system may include additional, less, or alternate functionality, including that discussed elsewhere herein.

In another aspect, a computer-implemented method for identifying property damage may be provided. The method may include (1) assigning, by a damage identification (DI) computing device, a geographical region to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously; (2) determining, via the DI computing device, a flight path to the geographical region for the drones to fly; (3) automatically navigating the drone fleet to, and then within, the geographical region to collect damage data associated with potentially damaged properties; (4) receiving, by the DI computing device, drone-collected damage data associated with a first property within the geographical region from the drone fleet when the drone fleet determines the first property is potentially damaged from analysis of drone data; (5) generating, by the DI computing device, aggregated damage data associated with the first property based at least partially upon the drone-collected damage data that is collected by two or more drones; and/or (6) storing the aggregated damage data in a blockchain structure associated with the first property for damage assessment of the first property. The first property may be, for example, a home, vehicle, or boat. The method may include additional, less, or alternate actions, including that discussed elsewhere herein.

In another aspect, a computer-implemented method for identifying property damage may be provided. The method may include (1) assigning, via one or more processors, a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously; (2) directing, via the one or more processors, the drone fleet to travel or fly to the geo-fenced area; (3) directing, via the one or more processors, the drone fleet to automatically navigate within the geographical area to collect initial, high level damage (e.g., image) data associated with potentially damaged properties (such as collect only a limited number of images, e.g., 1 or 2 images); (4) determining, via the one or more processors, which properties within the geo-fenced area are damaged, and which are undamaged, based upon processor analysis of the damage/image data collected; (5) directing, via the one or more processors, the drone fleet to take more detailed (and/or more numerous, e.g., several or more) images of the damaged properties within the geo-fenced area; (6) stitching or aggregating, via the one or more processors, images from two or more drones of the drone fleet of a damaged property to form aggregate images; (7) hashing, via the one or more processors, the aggregate images or associated file links, along with a time stamp, and adding the hashed information to a block; and/or (8) adding the block, via the one or more processors, to a blockchain structure (such as after consensus among nodes in blockchain network has been formed to add the block to the blockchain) associated with the damaged property to facilitate damage assessment of the damaged property and prolonging drone battery life. The method may include additional, less, or alternate actions, including those discussed elsewhere herein.

In another aspect, a computer-implemented method for identifying property damage may be provided. The method may include (1) assigning, via one or more processors, a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously; (2) directing, via the one or more processors, the drone fleet to fly (e.g., for aerial drones) or otherwise travel or drive (e.g., for land rovers or land-based drones) to the geo-fenced area; (3) directing, via the one or more processors, the drone fleet to automatically navigate within the geographical area to collect initial, high level (or sparse, or limited) image data (such as only a single image, or take only a few images, such as 3-5) associated with potentially damaged properties; (4) determining, via the one or more processors, which properties within the geo-fenced area are damaged, and which are undamaged, based upon processor analysis or machine learning algorithm analysis of the image data collected; (5) directing, via the one or more processors, the two or more drones of the drone fleet to take more detailed or numerous images (such as taking images farther away or closer to the damage property, or taking a larger number of images, such as ten or more, from different views, angles, and/or elevations) of a damaged property within the geo-fenced area by coordinating the flight paths of the two or more drones; (6) stitching or aggregating, via the one or more processors, images from the two or more drones of the drone fleet of a damaged property to form aggregate images; (7) hashing, via the one or more processors, the aggregate images or associated file links, along with a time stamp; (8) creating, via the one or more processors, a new block that includes the hashed information; and/or (9) adding the block, via the one or more processors, to a blockchain structure associated with the damaged property (such as after consensus among nodes in a blockchain network has been formed to add the block to the blockchain) to facilitate damage assessment of the damaged property (such as a home, vehicle, or boat). The method may include additional, less, or alternate actions, including those discussed elsewhere herein.

In another aspect, a computer system configured to identify property damage may be provided. The computer system may include one or more processors, servers, sensors, and/or transceivers configured to: (1) assign a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously; (2) direct the drone fleet to travel or fly to the geo-fenced area; (3) direct the drone fleet to automatically navigate within the geographical area to collect initial, high level damage (e.g., image) data associated with potentially damaged properties (such as acquire a single photo or image); (4) determine which properties within the geo-fenced area are damaged, and which are undamaged, based upon processor analysis of the damage/image data collected; (5) direct the drone fleet to take more detailed or numerous images of the damaged properties within the geo-fenced area (such as acquire several images from different elevations, angles, and perspectives); (6) stitch or aggregate images from two or more drones of the drone fleet of a damaged property to form aggregate images; (7) hash the aggregate images or associated file links, along with a time stamp, and add the hashed information to a block; and/or (8) add the block to a blockchain structure (such as after consensus among nodes in blockchain network has been formed to add the block to the blockchain) associated with the damaged property to facilitate damage assessment of the damaged property and prolonging drone battery life. The system may include additional, less, or alternate functionality, including that discussed elsewhere herein.

In another aspect, a computer system configured to identify property damage may be provided. The computer system may include one or more processors, servers, sensors, and/or transceivers configured to: (1) assign a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously; (2) direct the drone fleet to fly (e.g., for aerial drones) or otherwise travel (e.g., for land rovers) to the geo-fenced area; (3) direct the drone fleet to automatically navigate within the geographical area to collect initial, high level (or sparse) image data (such as only take a few images, such as 3-5) associated with potentially damaged properties; (4) determine which properties within the geo-fenced area are damaged, and which are undamaged, based upon processor analysis or machine learning algorithm analysis of the image data collected; (5) direct the two or more drones of the drone fleet to take more detailed or numerous images (such as taking images farther away or closer to the damage property, or taking a larger number of images, such as ten or more, from different views, angles, and/or elevations) of a damaged property within the geo-fenced area by coordinating the flight paths of the two or more drones; (6) stitch or aggregate images from the two or more drones of the drone fleet of a damaged property to form aggregate images; (7) hash the aggregate images or associated file links, along with a time stamp; (8) create a new block that includes the hashed information; and/or (9) add the block, via the one or more processors, to a blockchain structure associated with the damaged property (such as after consensus among nodes in a blockchain network has been formed to add the block to the blockchain) to facilitate damage assessment of the damaged property. The system may include additional, less, or alternate functionality, including that discussed elsewhere herein.

In yet another aspect, a DI system for identifying property damage may be provided. The DI system may include a drone fleet including a plurality of drones communicatively coupled together, and a DI computing device including at least one processor and a memory communicatively coupled to the processor. Each drone may collect damage data for properties. The processor may be programmed to: (1) assign each drone to a respective subarea of a geographical region, wherein each drone may automatically navigate to the assigned subarea to detect potential damage to properties; (2) receive initial sensor data associated with a first property from a first drone, wherein the first property may be within the respective subarea assigned to the first drone; (3) determine the first property may be potentially damaged, or is damaged, based at least partially upon the initial sensor data, wherein the drone fleet may automatically navigate to the first property in response to the determination; (4) receive drone-collected damage data associated with the first property from the drone fleet; (5) generate aggregated damage data associated with the first property based at least partially upon the drone-collected damage data; and/or (6) store the aggregated damage data in a blockchain structure associated with the first property for damage assessment of the first property. The DI system may include additional, fewer, or alternative devices, including those described elsewhere herein.

In a further aspect, a computer-implemented method for identifying property damage may be provided. The method may be at least partially performed by a DI computing device. The method may include: (1) assigning a geographical region to a drone fleet including a plurality of drones communicatively coupled together, wherein each drone may be assigned to a respective subarea of the geographical region; (2) receiving initial sensor data associated with a first property from a first drone, wherein the first property may be within the respective subarea assigned to the first drone; (3) determining the first property may be potentially damaged, or is actually damaged, based at least partially upon the initial sensor data, wherein the drone fleet may automatically navigate to the first property in response to the determination; (4) receiving drone-collected damage data associated with the first property from the drone fleet; (5) generating aggregated damage data associated with the first property based at least partially upon the drone-collected damage data; and/or (6) storing the aggregated damage data in a blockchain structure associated with the first property for damage assessment of the first property.

The method may include (i) estimating an amount of damage to the damaged property, and processing an insurance claim associated with the damage property based upon the images and/or the estimate of damage, or alternatively or additionally, (ii) estimating a repair or replacement cost for the damage to the damaged property, and processing an insurance claim associated with the damage property based upon the images and/or the repair or replacement cost of the damage. The repair cost or damage estimate may be estimated by a machine learning that is trained with historical claim images (that have a known amount of damage or repair cost) to identify similar patterns of damage in the drone images acquired. The damaged property may be, for instance, a home, boat, or automobile, and the drones may be aerial drones or unmanned aerial vehicles, or land-based drones or rovers. The method may include additional, fewer, or alternative steps, including those described elsewhere herein, and the DI system may be configured to perform the functionality or actions of the methods discussed herein.

In another aspect, at least one non-transitory computer-readable storage media having computer-executable instructions embodied thereon may be provided. When executed by at least one processor, the computer-executable instructions cause the at least one processor to: (1) assign a geographical region to a drone fleet comprising a plurality of drones that may be communicatively coupled together and may automatically navigate within the geographical region to detect potential damage to properties, wherein each drone may be assigned to a respective subarea of the geographical region; (2) receive initial sensor data associated with a first property from a first drone of the plurality of drones, wherein the first property may be within the respective subarea assigned to the first drone; (3) determine the first property may be potentially damaged, or is actually damaged, based at least partially upon the initial sensor data, wherein the drone fleet may automatically navigate to the first property in response to the determination; (4) receive drone-collected damage data associated with the first property from the drone fleet; (5) generate aggregated damage data associated with the first property based at least partially upon the drone-collected damage data; and/or (6) store the aggregated damage data in a blockchain structure associated with the first property for damage assessment of the first property. The instructions may direct additional, less, or alternate functionality, including that discussed elsewhere herein.

In another aspect, at least one non-transitory computer-readable storage media having computer-executable instructions embodied thereon may be provided. When by at least one processor, the computer-executable instructions cause the at least one processor to: (1) assign a geographical region to a drone fleet comprising a plurality of drones communicatively coupled together, wherein the drone fleet is configured to automatically navigate within the geographical region to detect potential damage to properties, (2) receive drone-collected damage data associated with a first property within the geographical region from the drone fleet when the drone fleet determines the first property is potentially damaged, (3) generate aggregated damage data associated with the first property based at least partially upon the drone-collected damage data, and/or (4) store the aggregated damage data in a blockchain structure associated with the first property for damage assessment of the first property. The computer-readable storage media may further cause the at least one processor to notify at least one of an insurance policyholder and an insurance provider associated with an insurance policy of the first property that the first property is potentially damaged, wherein the insurance provider reviews the blockchain structure to resolve an insurance claim for the first property The computer-readable storage media may further cause the at least one processor to retrieve a list of insured properties within the geographical region from a database, wherein the list of insured properties includes the first property and indicates a location of each property identified in the list of insured properties, and transmit the list of insured properties to the drone fleet, wherein the drone fleet is configured to automatically navigate to the locations indicated by the list of insured properties.

In certain embodiments, where the drone-collected damage data collected by the plurality of drones includes a plurality of images associated with the first property, the computer-executable instructions may further cause the at least one processor to generate a three dimensional (3D) model of the first property using the plurality of images and store the 3D model in the block of the blockchain.

In some embodiments, the computer-executable instructions may further cause the at least one processor to receive external damage data associated with the first property from an external device, and generate the aggregated damage data associated with the first property based at least partially upon the drone-collected damage data and the received external damage data.

In another aspect, a damage identification (DI) system for identifying property damage is provided, including a drone fleet comprising two or more drones communicatively coupled together (such as via wireless communication or data transmission over a radio frequency link or communication channel) and a DI computing device. Each drone may be configured to collect damage data, including image data, and each drone may be configured to operate autonomously or semi-autonomously. The DI computing device is configured to (1) assign a geographical region to the drone fleet, wherein the drone fleet is configured to automatically navigate to, and then within, the geographical region to detect potential damage to properties, (2) receive drone-collected damage data associated with a first property within the geographical region from the drone fleet when the drone fleet determines the first property is potentially damaged from analysis of the drone data, (3) generate aggregated damage data associated with the first property based at least partially upon the drone-collected damage data, and/or (4) store the aggregated damage data in a blockchain structure associated with the first property for damage assessment of the first property.

In another aspect, a computer-implemented method for identifying property damage is provided, including (1) assigning, by a damage identification (DI) computing device, a geographical region to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously, (2) automatically navigating the drone fleet to, and then within, the geographical region to collect damage data associated with potentially damaged properties, (3) receiving, by the DI computing device, drone-collected damage data associated with a first property within the geographical region from the drone fleet when the drone fleet determines the first property is potentially damaged from analysis of drone data, (4) generating, by the DI computing device, aggregated damage data associated with the first property based at least partially upon the drone-collected damage data, and/or (5) storing the aggregated damage data in a blockchain structure associated with the first property for damage assessment of the first property.

In another aspect, a damage identification (DI) system for identifying property damage is provided. The DI system includes a drone fleet comprising two or more drones communicatively coupled together (such as via wireless communication or data transmission over a radio frequency link or communication channel), and a DI computing device. Each drone may be configured to collect damage data, including image data, and each drone may be further configured to operate autonomously or semi-autonomously. The DI computing device is configured to (1) assign a geographical region to the drone fleet, and determine a flight path to the geographical region for the drone fleet, wherein the drone fleet is configured to automatically navigate to, and then within, the geographical region to detect potential damage to properties, (2) receive drone-collected damage data associated with a first property within the geographical region from the drone fleet when the drone fleet determines the first property is potentially damaged from analysis of drone data collected by one or more drones, (3) generate aggregated damage data associated with the first property based at least partially upon damage data collected by two or more drones, and/or (4) store the aggregated damage data in a blockchain structure associated with the first property for damage assessment of the first property.

In another aspect, a computer-implemented method for identifying property damage is provided, the method including: (1) assigning, by a damage identification (DI) computing device, a geographical region to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously, (2) determining, via the DI computing device, a flight path to the geographical region for the drones to fly, (3) automatically navigating the drone fleet to, and then within, the geographical region to collect damage data associated with potentially damaged properties, (4) receiving, by the DI computing device, drone-collected damage data associated with a first property within the geographical region from the drone fleet when the drone fleet determines the first property is potentially damaged from analysis of drone data, (5) generating, by the DI computing device, aggregated damage data associated with the first property based at least partially upon the drone-collected damage data that is collected by two or more drones, and (6) storing the aggregated damage data in a blockchain structure associated with the first property for damage assessment of the first property.

In another aspect, a computer-implemented method for identifying property damage is provided, the method including: (1) assigning, via one or more processors, a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously, (2) directing, via the one or more processors, the drone fleet to travel or fly to the geo-fenced area, (3) directing, via the one or more processors, the drone fleet to automatically navigate within the geographical area to collect initial, high level damage (e.g., image) data associated with potentially damaged properties, (4) determining, via the one or more processors, which properties within the geo-fenced area are damaged, and which are undamaged, based upon processor analysis of the damage/image data collected, (5) directing, via the one or more processors, the drone fleet to take more detailed (and/or more numerous) images of the damaged properties within the geo-fenced area, (6) stitching or aggregating, via the one or more processors, images from two or more drones of the drone fleet of a damaged property to form aggregate images; (7) hashing, via the one or more processors, the aggregate images or associated file links, along with a time stamp, and adding the hashed information to a block, and/or (8) adding the block, via the one or more processors, to a blockchain structure (such as after consensus among nodes in blockchain network has been formed to add the block to the blockchain) associated with the damaged property to facilitate damage assessment of the damaged property and prolonging drone battery life. The method may further include estimating an amount of damage to the damaged property, and processing an insurance claim associated with the damage property based upon the images and/or the estimate of damage, and/or estimating a repair or replacement cost for the damage to the damaged property, and processing an insurance claim associated with the damage property based upon the images and/or the repair or replacement cost of the damage. The damaged property may be a home, boat, or automobile. The drones may be aerial drones or unmanned aerial vehicles. The drones may also be land-based drones or rovers.

In another aspect, a computer-implemented method for identifying property damage is provided, the method including: (1) assigning, via one or more processors, a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously, (2) directing, via the one or more processors, the drone fleet to fly (e.g., for aerial drones) or otherwise travel (e.g., for land rovers) to the geo-fenced area, (3) directing, via the one or more processors, the drone fleet to automatically navigate within the geographical area to collect initial, high level (or sparse) image data (such as only take a few images, such as 3-5) associated with potentially damaged properties, (4) determining, via the one or more processors, which properties within the geo-fenced area are damaged, and which are undamaged, based upon processor analysis or machine learning algorithm analysis of the image data collected, (5) directing, via the one or more processors, the two or more drones of the drone fleet to take more detailed or numerous images (such as taking images farther away or closer to the damage property, or taking a larger number of images, such as ten or more, from different views, angles, and/or elevations) of a damaged property within the geo-fenced area by coordinating the flight paths of the two or more drones, (6) stitching or aggregating, via the one or more processors, images from the two or more drones of the drone fleet of a damaged property to form aggregate images, (7) hashing, via the one or more processors, the aggregate images or associated file links, along with a time stamp, (8) creating, via the one or more processors, a new block that includes the hashed information, and/or (9) adding the block, via the one or more processors, to a blockchain structure associated with the damaged property (such as after consensus among nodes in a blockchain network has been formed to add the block to the blockchain) to facilitate damage assessment of the damaged property. The method may further include estimating an amount of damage to the damaged property, and processing an insurance claim associated with the damage property based upon the images and/or the estimate of damage. In certain embodiments, the method includes estimating a repair or replacement cost for the damage to the damaged property, and processing an insurance claim associated with the damage property based upon the images and/or the repair or replacement cost of the damage. The damaged property may be a home, boat, or automobile. The drones may be aerial drones or unmanned aerial vehicles. The drones may also be land-based drones or rovers.

In another aspect, a computer system configured to identify property damage is provided, the computer system including one or more processors, servers, sensors, and/or transceivers. The computer system is configured to: (1) assign a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously, (2) direct the drone fleet to travel or fly to the geo-fenced area, (3) direct the drone fleet to automatically navigate within the geographical area to collect initial, high level damage (e.g., image) data associated with potentially damaged properties, (4) determine which properties within the geo-fenced area are damaged, and which are undamaged, based upon processor analysis of the damage/image data collected, (5) direct the drone fleet to take more detailed images of the damaged properties within the geo-fenced area, (6) stitch or aggregate images from two or more drones of the drone fleet of a damaged property to form aggregate images, (7) hash the aggregate images or associated file links, along with a time stamp, and add the hashed information to a block, and/or (8) add the block to a blockchain structure (such as after consensus among nodes in blockchain network has been formed to add the block to the blockchain) associated with the damaged property to facilitate damage assessment of the damaged property and prolonging drone battery life.

In another aspect, a computer system configured to identify property damage is provided, the computer system including one or more processors, servers, sensors, and/or transceivers. The computer system is configured to: (1) assign a geo-fenced or other graphical area to a drone fleet including two or more drones communicatively coupled together (such as via wireless communication or data transmission over a radio frequency link or communication channel), wherein each drone is configured to collect damage data, including image data, and each drone is configured to operate autonomously or semi-autonomously, (2) direct the drone fleet to fly (e.g., for aerial drones) or otherwise travel (e.g., for land rovers) to the geo-fenced area, (3) direct the drone fleet to automatically navigate within the geographical area to collect initial, high level (or sparse) image data (such as only take a few images, such as 3-5) associated with potentially damaged properties, (4) determine which properties within the geo-fenced area are damaged, and which are undamaged, based upon processor analysis or machine learning algorithm analysis of the image data collected, (5) direct the two or more drones of the drone fleet to take more detailed or numerous images (such as taking images farther away or closer to the damage property, or taking a larger number of images, such as ten or more, from different views, angles, and/or elevations) of a damaged property within the geo-fenced area by coordinating the flight paths of the two or more drones, (6) stitch or aggregate images from the two or more drones of the drone fleet of a damaged property to form aggregate images, (7) hash the aggregate images or associated file links, along with a time stamp, (8) create a new block that includes the hashed information, and (9) add the block, via the one or more processors, to a blockchain structure associated with the damaged property (such as after consensus among nodes in a blockchain network has been formed to add the block to the blockchain) to facilitate damage assessment of the damaged property.

In another aspect a damage identification (DI) system for identifying property damage is provided, the DI system including a drone fleet comprising a plurality of drones communicatively coupled together and a DI computing device comprising at least one processor and a memory communicatively coupled to the at least one processor. Each drone of the plurality of drones may be configured to collect damage data. The DI computing device is configured to: (1) assign each drone of the plurality of drones to a respective subarea of a geographical region, wherein each drone is configured to automatically navigate to the assigned subarea to detect potential damage to properties, (2) receive initial sensor data associated with a first property from a first drone of the plurality of drones, wherein the first property is within the respective subarea assigned to the first drone, (3) determine the first property is potentially damaged based at least partially upon the initial sensor data, wherein the drone fleet automatically navigates to the first property in response to the determination, (4) receive drone-collected damage data associated with the first property from the drone fleet, (5) generate aggregated damage data associated with the first property based at least partially upon the drone-collected damage data, and/or (6) store the aggregated damage data in a blockchain structure associated with the first property for damage assessment of the first property. The DI computing device may be further configured to receive geolocation data associated with the first property from the first drone, and transmit the geolocation data to the plurality of drones, wherein the plurality of drones automatically navigate to the first property based upon the geolocation data. The DI computing device may also be configured to transmit a list of insured properties within an assigned subarea to each drone of the plurality of drones, wherein the list of insured properties indicates a location of each property identified in the list of insured properties.

In another aspect, a computer-implemented method for identifying property damage is provided, the method including: (1) assigning, by a damage identification (DI) computing device, a geographical region to a drone fleet including a plurality of drones communicatively coupled together, wherein each drone of the plurality of drones is assigned to a respective subarea of the geographical region, (2) receiving initial sensor data associated with a first property from a first drone of the plurality of drones, wherein the first property is within the respective subarea assigned to the first drone, (3) determining the first property is potentially damaged based at least partially upon the initial sensor data, wherein the drone fleet automatically navigates to the first property in response to the determination, (4) receiving, by the DI computing device, drone-collected damage data associated with the first property from the drone fleet, (5) generating, by the DI computing device, aggregated damage data associated with the first property based at least partially upon the drone-collected damage data and/or (6) storing the aggregated damage data in a blockchain structure associated with the first property for damage assessment of the first property. The method may further include receiving, by the DI computing device, geolocation data associated with the first property from the first drone, and transmitting the geolocation data to the plurality of drones when the first property is determined to be damaged, wherein the plurality of drones automatically navigate to the first property based upon the geolocation data. The method may also include estimating a repair or replacement cost for the damage to the damaged property, and processing an insurance claim associated with the damage property based upon the images and/or the repair or replacement cost of the damage. The damaged property may be a home, boat, or automobile. The drones may be aerial drones or unmanned aerial vehicles. The drones may also be land-based drones or rovers. In some embodiments, the method further includes transmitting, by the DI computing device, a list of insured properties within an assigned subarea to each drone of the plurality of drones, wherein the list of insured properties indicates a location of each property identified in the list of insured properties.

In another aspect, at least one non-transitory computer-readable storage media is provided having computer-executable instructions embodied thereon. When executed by at least one processor, the computer-executable instructions cause the at least one processor to: (1) assign a geographical region to a drone fleet comprising a plurality of drones communicatively coupled together and configured to automatically navigate within the geographical region to detect potential damage to properties, wherein each drone of the plurality of drones is assigned to a respective subarea of the geographical region, (2) receive initial sensor data associated with a first property from a first drone of the plurality of drones, wherein the first property is within the respective subarea assigned to the first drone, (3) determine the first property is potentially damaged based at least partially upon the initial sensor data, wherein the drone fleet automatically navigates to the first property in response to the determination, (4) receive drone-collected damage data associated with the first property from the drone fleet, (5) generate aggregated damage data associated with the first property based at least partially upon the drone-collected damage data, and/or (6) store the aggregated damage data in a blockchain structure associated with the first property for damage assessment of the first property.

The computer-executable instructions may further cause the at least one processor to receive geolocation data associated with the first property from the first drone, and transmit the geolocation data to the plurality of drones, wherein the plurality of drones automatically navigate to the first property based upon the geolocation data. In some embodiments, the computer-executable instructions further cause the at least one processor to transmit a list of insured properties within an assigned subarea to each drone of the plurality of drones, wherein the list of insured properties indicates a location of each property identified in the list of insured properties.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A damage identification (DI) system for identifying property damage, the DI system comprising:
   a drone fleet comprising a plurality of drones communicatively coupled together, wherein each of the plurality of drones comprises one or more sensors, and wherein the drone fleet is configured to:
      in response to determining that a first property within a geographical region is damaged, collect, using the one or more sensors, damage data associated with the first property; and
   a DI computing device comprising at least one processor and a memory communicatively coupled to the at least one processor, the DI computing device in communication with at least one of the plurality of drones, wherein the at least one processor is configured to:
      assign the geographical region to the drone fleet, wherein the drone fleet is configured to automatically navigate within the geographical region to detect damage to properties using the one or more sensors;
      receive the drone-collected damage data associated with the first property from the drone fleet;
      generate aggregated damage data associated with the first property based at least partially upon the drone-collected damage data; and
      notify an external device that the first property is damaged.

2. The DI system of claim 1, wherein the at least one processor is further configured to:
   store the aggregated damage data in a blockchain structure associated with the first property as part of a historical record of the first property.

3. The DI system of claim 1, wherein the at least one processor is further configured to:
   receive geolocation data associated with the first property from a first drone of the plurality of drones; and
   transmit the geolocation data to the plurality of drones, wherein the plurality of drones automatically navigate to the first property based upon the geolocation data.

4. The DI system of claim 1, wherein the at least one processor is further configured to transmit a list of insured properties within an assigned subarea to each drone of the plurality of drones, wherein the list of insured properties indicates a location of each property identified in the list of insured properties.

5. The DI system of claim 1, wherein the drone-collected damage data includes sensor data including a plurality of images associated with the first property.

6. The DI system of claim 5, wherein the at least one processor is further configured to generate a three dimensional (3D) model of the first property using the plurality of images.

7. The DI system of claim 5, wherein the at least one processor is further configured to:
   estimate an amount of damage to the first property; and
   process an insurance claim associated with the first property based upon the plurality of images and the estimated amount of damage.

8. The DI system of claim 5, wherein the at least one processor is further configured to:
   estimate at least one of a repair and replacement cost for an estimated amount of damage to the first property; and
   automatically initiate processing of an insurance claim associated with the first property based upon the plurality of images and the estimated cost of the estimated amount of damage.

9. The DI system of claim 1, wherein the external device is associated with one of an insurance policyholder of the first property and insurance provider associated with an insurance policy of the first property.

10. The DI system of claim 1, wherein the at least one processor is further configured to:
    receive external damage data associated with the first property from an external computing device; and
    generate the aggregated damage data based at least partially upon the received external damage data.

11. The DI system of claim 1, wherein the drone fleet is further configured to:
    evaluate the drone-collected damage data of the first property to establish a damage consensus; and
    transmit the drone-collected damage data to the DI computing device when the damage consensus indicates damage to the first property.

12. The DI system of claim 1, wherein at least one of the drone fleet or the DI computing device is configured to determine the first property is damaged.

13. A computer-implemented method for identifying property damage, the method comprising:
    assigning, by a damage identification (DI) computing device, a geographical region to a drone fleet including a plurality of drones communicatively coupled together, wherein each of the plurality of drones includes one or more sensors;
    automatically navigating the drone fleet within the geographical region to detect damage to properties using the one or more sensors;
    in response to determining that a first property within the geographical region is damaged, collecting, using the drone fleet and the one or more sensors, damage data associated with the first property;
    receiving, by the DI computing device, the drone-collected damage data associated with the first property from the drone fleet;
    generating, by the DI computing device, aggregated damage data associated with the first property based at least partially upon the drone-collected damage data; and
    notifying, by the DI computing device, an external device that the first property is damaged.

14. The computer-implemented method of claim 13 further comprising:
  storing the aggregated damage data in a blockchain structure associated with the first property as part of a historical record of the first property.

15. The computer-implemented method of claim 13 further comprising:
  receiving geolocation data associated with the first property from a first drone of the plurality of drones; and
  transmitting the geolocation data to the plurality of drones, wherein the plurality of drones automatically navigate to the first property based upon the geolocation data.

16. The computer-implemented method of claim 13 further comprising transmitting a list of insured properties within an assigned subarea to each drone of the plurality of drones, wherein the list of insured properties indicates a location of each property identified in the list of insured properties.

17. The computer-implemented method of claim 13 further comprising generating a three dimensional (3D) model of the first property using a plurality of images included in sensor data, wherein the drone-collected damage data includes the sensor data.

18. The computer-implemented method of claim 13 further comprising:
  receiving external damage data associated with the first property from an external computing device; and
  generating the aggregated damage data based at least partially upon the received external damage data.

19. The computer-implemented method of claim 13 further comprising:
  evaluating the drone-collected damage data of the first property to establish a damage consensus; and
  transmitting the drone-collected damage data to the DI computing device when the damage consensus indicates damage to the first property.

20. At least one non-transitory computer-readable storage medium having computer-executable instructions embodied thereon, wherein when executed by at least one processor, the computer-executable instructions cause the at least one processor to:
  assign a geographical region to a drone fleet comprising a plurality of drones communicatively coupled together, wherein each of the plurality of drones comprises one or more sensors, and wherein the drone fleet is configured to automatically navigate within the geographical region to detect damage to properties using the one or more sensors;
  in response to determining that a first property within the geographical region is damaged, instruct the drone fleet to collect damage data associated with the first property using the one or more sensors;
  receive drone-collected damage data associated with the first property within from the drone fleet;
  generate aggregated damage data associated with the first property based at least partially upon the drone-collected damage data; and
  notify an external device that the first property is damaged.

* * * * *